US011922960B2

(12) United States Patent
Sung et al.

(10) Patent No.: US 11,922,960 B2
(45) **Date of Patent: *Mar. 5, 2024**

(54) METHOD AND DEVICE FOR QUANTIZING LINEAR PREDICTIVE COEFFICIENT, AND METHOD AND DEVICE FOR DEQUANTIZING SAME

(71) Applicants: SAMSUNG ELECTRONICS CO., LTD., Suwon-si (KR); INDUSTRY-UNIVERSITY COOPERATION FOUNDATION HANYANG UNIVERSITY ERICA CAMPUS, Gyeonggi-do (KR)

(72) Inventors: Ho-sang Sung, Yongin-si (KR); Sang-won Kang, Seongnam-si (KR); Jong-hyun Kim, Samcheok-si (KR); Eun-mi Oh, Seoul (KR)

(73) Assignees: SAMSUNG ELECTRONICS CO., LTD., Suwon-si (KR); INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 6 days.

This patent is subject to a terminal disclaimer.

(21) Appl. No.: 17/571,597

(22) Filed: Jan. 10, 2022

(65) Prior Publication Data

US 2022/0130403 A1 Apr. 28, 2022

Related U.S. Application Data

(63) Continuation of application No. 16/700,246, filed on Dec. 2, 2019, now Pat. No. 11,238,878, which is a (Continued)

(51) Int. Cl.
*G10L 19/00* (2013.01)
*G10L 19/022* (2013.01)

(Continued)

(52) U.S. Cl.
CPC .......... *G10L 19/038* (2013.01); *G10L 19/022* (2013.01); *G10L 19/04* (2013.01); *G10L 19/06* (2013.01)

(58) Field of Classification Search
None
See application file for complete search history.

(56) References Cited

U.S. PATENT DOCUMENTS 5,596,659 A 6/1997 Normile et al.
5,649,030 A 7/1997 Normile et al.

(Continued)

FOREIGN PATENT DOCUMENTS

CN 1372247 A 10/2002
CN 1451155 10/2003

(Continued)

OTHER PUBLICATIONS

Communication dated Jan. 24, 2022 by the Korean Intellectual Property Office in counterpart Korean Application No. 10-2016-7026991.

(Continued)

*Primary Examiner* — Satwant K Singh
(74) *Attorney, Agent, or Firm* — Sughrue Mion, PLLC

(57) ABSTRACT

A quantization device includes: a trellis-structured vector quantizer which quantizes a first error vector between an N-dimensional (here, "N" is two or more) subvector and a first predictive vector; and an inter-frame predictor which generates a first predictive vector from the quantized N-dimensional subvector, wherein the inter-frame predictor uses a predictive coefficient comprising an N×N matrix and (Continued)

performs an inter-frame prediction using the quantized N-dimensional subvector of a previous stage.

12 Claims, 30 Drawing Sheets

Related U.S. Application Data continuation of application No. 15/309,334, filed as application No. PCT/KR2015/004577 on May 7, 2015, now Pat. No. 10,504,532.

(60) Provisional application No. 62/029,687, filed on Jul. 28, 2014, provisional application No. 61/989,725, filed on May 7, 2014.

(51) Int. Cl.

| | |
|---|---|
| ***G10L 19/038*** | (2013.01) |
| ***G10L 19/04*** | (2013.01) |
| ***G10L 19/06*** | (2013.01) |
| ***G10L 21/00*** | (2013.01) |

(56) References Cited

U.S. PATENT DOCUMENTS

| | | | |
|---|---|---|---|
| 5,774,839 | A | 6/1998 | Shlomot |
| 5,802,487 | A | 9/1998 | Tanaka |
| 5,826,224 | A | 10/1998 | Gerson et al. |
| 5,974,181 | A | 10/1999 | Prieto |
| 6,055,496 | A | 4/2000 | Heidari |
| 6,122,608 | A | 9/2000 | McCree |
| 6,125,149 | A | 9/2000 | Jafarkhani et al. |
| 7,106,228 | B2 | 9/2006 | Bessette et al. |
| 7,130,796 | B2 | 10/2006 | Tasaki |
| 7,243,061 | B2 | 7/2007 | Norimatsu et al. |
| 7,414,549 | B1 | 8/2008 | Yang et al. |
| 7,630,890 | B2 * | 12/2009 | Son ........................ G10L 19/06 704/219 |
| 7,944,377 | B2 | 5/2011 | Sung et al. |
| 8,249,860 | B2 | 8/2012 | Sato et al. |
| 8,352,258 | B2 | 1/2013 | Yamanashi et al. |
| 8,493,244 | B2 | 7/2013 | Satoh et al. |
| 8,670,990 | B2 | 3/2014 | Chen et al. |
| 8,706,481 | B2 | 4/2014 | Lee et al. |
| 8,977,543 | B2 | 3/2015 | Sung |
| 8,977,544 | B2 | 3/2015 | Sung |
| 9,153,238 | B2 | 10/2015 | Jeong et al. |
| 9,773,507 | B2 | 9/2017 | Sung |
| 10,204,628 | B2 | 2/2019 | Gao |
| 10,229,692 | B2 | 3/2019 | Sung et al. |
| 10,395,665 | B2 | 8/2019 | Sung et al. |
| 10,504,532 | B2 | 12/2019 | Sung |
| 10,515,646 | B2 | 12/2019 | Sung |
| 10,580,425 | B2 | 3/2020 | Sung et al. |
| 11,238,878 | B2 * | 2/2022 | Sung ....................... G10L 19/06 |
| 2001/0019591 | A1 | 9/2001 | Jafarkhani et al. |
| 2004/0230429 | A1 | 11/2004 | Son |
| 2007/0067166 | A1 | 3/2007 | Pan et al. |
| 2007/0299659 | A1 | 12/2007 | Chamberlain |
| 2009/0164210 | A1 | 6/2009 | Su et al. |
| 2011/0029304 | A1 | 2/2011 | Chen et al. |
| 2012/0271629 | A1 | 10/2012 | Sung et al. |
| 2012/0278069 | A1 | 11/2012 | Sung et al. |
| 2015/0162016 | A1 | 6/2015 | Sung et al. |
| 2017/0178649 | A1 | 6/2017 | Sung |
| 2017/0221494 | A1 | 8/2017 | Sung |

FOREIGN PATENT DOCUMENTS

| | | | | |
|---|---|---|---|---|
| CN | 1839426 | A | 9/2006 | |
| CN | 101399041 | A | 4/2009 | |
| CN | 101506876 | A | 8/2009 | |
| CN | 101548317 | A | 9/2009 | |
| CN | 101609682 | A | 12/2009 | |
| CN | 101615393 | A | 12/2009 | |
| CN | 102906812 | A | 1/2013 | |
| CN | 103050121 | A | 4/2013 | |
| CN | 103236262 | A | 8/2013 | |
| CN | 103262161 | A | 8/2013 | |
| CN | 103620675 | | 3/2014 | |
| CN | 103620676 | A | 3/2014 | |
| CN | 103632673 | A | 3/2014 | |
| CN | 105825860 | A | 8/2016 | |
| EP | 0 614 075 | A2 | 9/1994 | |
| EP | 1450352 | A2 * | 8/2004 | ......... G10L 19/0212 |
| EP | 2139000 | B1 | 5/2011 | |
| EP | 3 869 508 | A1 | 8/2021 | |
| JP | 2003-140693 | A | 5/2003 | |
| JP | 2004-252462 | A | 9/2004 | |
| KR | 10-2000-0010994 | A | 2/2000 | |
| KR | 10-2004-0074561 | A | 8/2004 | |
| KR | 10-0728056 | B1 | 6/2007 | |
| KR | 10-2008-0092770 | A | 10/2008 | |
| KR | 10-2009-0070554 | A | 7/2009 | |
| KR | 10-2011-0130290 | A | 12/2011 | |
| KR | 10-2012-0039865 | A | 4/2012 | |
| KR | 10-2012-0120085 | A | 11/2012 | |
| KR | 10-2012-0120086 | A | 11/2012 | |
| WO | 2010/092827 | A1 | 8/2010 | |
| WO | 2011/087333 | A2 | 7/2011 | |
| WO | 2012/144877 | A2 | 10/2012 | |
| WO | 2012/144878 | A2 | 10/2012 | |

OTHER PUBLICATIONS

Communication dated Feb. 17, 2022 by the Korean Intellectual Property Office in counterpart Korean Application No. 10-2016-7031128.

ETSI, "Universal Mobile Telecommunications System (UMTS); LTE; EVS Codec Detailed Algorithmic Description", (3Gpp TS 26.445 version 12.0.0 Release 12), ETSI TS 126 445, V12.0.0, Nov. 2014. (627 pages total).

Communication dated Nov. 2, 2022 issued by the Korean Patent Office in counterpart Korean Patent Application No. 10-2022-7013950.

Communication dated Jan. 2, 2023 issued by the Korean Patent Office in counterpart Korean Patent Application No. 10-2022-7016454.

Communication dated Dec. 22, 2022 issued by Intellectual Property India in counterpart Indian Patent Application No. 201627036500.

Communication dated Jun. 9, 2022 by the European Patent Office in European Patent Application No. 15789302.5.

Communication dated Feb. 28, 2023, issued by the China National Intellectual Property Administration in counterpart Chinese Application No. 201911127329.3.

Communication dated Jan. 23, 2023, issued by the European Patent Office in counterpart European Application No. 21168545.8.

Communication dated Feb. 27, 2023, issued by the India Intellectual Property Office in Indian Patent Application No. 202328002006.

Communication dated Jul. 2, 2021 issued by the Korean Intellectual Property Office in counterpart Korean Application No. 10-2016-7026991.

Communication dated Aug. 5, 2021 issued by the Korean Intellectual Property Office in counterpart Korean Application No. 10-2016-7031128.

Sangwon Kang et al., "Low-Complexity Predictive Trellis-Coded Quantization of Speech Line Spectral Frequencies", IEEE Transactions on Signal Processing. vol. 52, No. 7, Jul. 2004, 10 pages total.

Communication dated Dec. 4, 2020 by the State Intellectual Property Office of P.R. China in counterpart Chinese Patent Application No. 201580037280.6.

Communication dated Feb. 6, 2020 issued by the State Intellectual Property Office of P.R. China in counterpart Chinese Application No. 201580037280.6.

Communication dated Mar. 8, 2019, issued by the State Intellectual Property Office in counterpart Chinese Patent Application No. 201580028157.8.

(56) References Cited

OTHER PUBLICATIONS

Saikat Chatterjee et al., "A Mixed-Split Scheme for 2-D DPCM Based LSF Quantization", TENCON 2005, 2005 IEEE Region 10 Conference; Nov. 21, 2005-Nov. 24, 2005, Melbourne, Australia, Nov. 1, 2005, pp. 1-6, XP055417090, (6 pages total).
G. Guibe et al., "Speech Spectral Quantizers for Wideband Speech Coding", European Transactions on Telecommunications, Wiley & Sons, Chichester, GB, vol. 12, No. 6, Dec. 1, 2001, pp. 535-545, XP001077403, (12 pages total).
C.-C. Kuo et al., "New LSP encoding method based on two-dimensional linear prediction", IEE Proceedings 1. Solid-State & Electron Devices. Institution of Electrical Engineers, Stevenage, GB, vol. 140, No. 6, Part 01, Dec. 1, 1993, pp. 415-419, XP000422809, (6 pages total).
Adriana Vasilache et al., "Flexible Spectrum Coding in the 3GPP EVS Codec", 2015 IEEE International Conference on Acoustics, Speech and Signal Processing (ICASSP), Apr. 1, 2015, pp. 5878-5882, XP055390658. (six (6) pages total).
Bouzid, Merouane, "Robust Quantization of LPC Parameters for Speech Communication Over Noisy Channel", Proc. ICADIWT '09, IEEE, Aug. 4, 2009, pp. 713-718, (7 pages total).
Communication dated Nov. 3, 2017 by the European Patent Office in counterpart European Patent Application No. 15789302.5.
Communication dated Jan. 9, 2018 by the Japanese Patent Office in counterpart Japanese Patent Application No. 2016-559611.
International Search Report (PCT/ISA/210) and Written Opinion (PCT/ISA/237) dated Dec. 28, 2015 issued by the International Searching Authority in counterpart International Application No. PCT/IB2015/001152.
International Search Report (PCT/ISA/210) and Written Opinion (PCT/ISA/237) dated Jul. 29, 2015 issued by the International Searching Authority in counterpart International Application No. PCT/KR2015/004577.
Sangeeta Ramakrishnan, et al., "Constrained-Storage Vector Quantization with a Universal Codebook", IEEE Transactions on Image Processing, vol. 7, No. 6. Jun. 1998, total 10 pages.
Jungeun Park, et al., "Block Constrained Trellis Coded Vector Quantization of LSF Parameters for Wideband Speech Codecs", ETRI Journal, vol. 30, No. 5, Oct. 2008, total 3 pages.
Thomas R. Fischer, et al., "Trellis-Coded Vector Quantization", IEEE Transactions on Information Theory, vol. 37, No. 6. Nov. 1991, total 16 pages.
Recommendation ITU-T G.718. "Frame error robust narrow-band and wideband embedded variable bit-rate coding of speech and audio from 8-32 kbit/s", Jun. 2008, total 257 pages.
Communication dated Apr. 24, 2023 by the United States Patent and Trademark Office in counterpart U.S. Appl. No. 17/947,249.
Notice of Allowance dated Aug. 9, 2023, issued by U.S. Patent Office in U.S. Appl. No. 17/947,249.
Notice of Allowance dated Oct. 12, 2023, issued by Chinese Patent Office in Chinese Patent Application No. 201911127329.3.
Communication dated Nov. 8, 2023 by the Intellectual Property India for Indian Patent Application No. 202328001977.

* cited by examiner

METHOD AND DEVICE FOR QUANTIZING LINEAR PREDICTIVE COEFFICIENT, AND METHOD AND DEVICE FOR DEQUANTIZING SAME

CROSS-REFERENCE TO RELATED APPLICATIONS

This application is a continuation application of U.S. application Ser. No. 16/700,246, filed on Dec. 2, 2019, which is a continuation application of U.S. application Ser. No. 15/309,334, filed on Dec. 16, 2016, now U.S. Pat. No. 10,504,532, issued Dec. 10, 2019, which is a national stage application of International Application No. PCT/KR2015/004577, filed May 7, 2015, which claims benefit of U.S. Provisional Application No. 62/029,687, filed Jul. 28, 2014, and U.S. Provisional Application No. 61/989,725, filed May 7, 2014, the disclosures of which are incorporated herein in their entirety by reference.

TECHNICAL FIELD

One or more exemplary embodiments relate to quantization and inverse quantization of a linear prediction coefficient, and more particularly, to a method and apparatus for efficiently quantizing a linear prediction coefficient with low complexity and a method and apparatus for inverse quantization.

BACKGROUND ART

In a system for encoding a sound such as speech or audio, a linear predictive coding (LPC) coefficient is used to represent a short-term frequency characteristic of the sound. The LPC coefficient is obtained in a form of dividing an input sound in frame units and minimizing energy of a prediction error for each frame. However, the LPC coefficient has a large dynamic range, and a characteristic of a used LPC filter is very sensitive to a quantization error of the LPC coefficient, and thus stability of the filter is not guaranteed.

Therefore, an LPC coefficient is quantized by converting the LPC coefficient into another coefficient in which stability of the filter is easily confirmed, interpolation is advantageous, and a quantization characteristic is good. It is mostly preferred that an LPC coefficient is quantized by converting the LPC coefficient into a line spectral frequency (LSF) or an immittance spectral frequency (ISF). Particularly, a scheme of quantizing an LSF coefficient may use a high inter-frame correlation of the LSF coefficient in a frequency domain and a time domain, thereby increasing a quantization gain.

An LSF coefficient exhibits a frequency characteristic of a short-term sound, and in a case of frame in which a frequency characteristic of an input sound sharply varies, an LSF coefficient of a corresponding frame also sharply varies. However, a quantizer including an inter-frame predictor using a high inter-frame correlation of an LSF coefficient cannot perform proper prediction for a sharply varying frame, and thus, quantization performance decreases. Therefore, it is necessary to select an optimized quantizer in correspondence with a signal characteristic of each frame of an input sound.

DISCLOSURE

Technical Problems

One or more exemplary embodiments include a method and apparatus for efficiently quantizing a linear predictive coding (LPC) coefficient with low complexity and a method and apparatus for inverse quantization.

Technical Solution

According to one or more exemplary embodiments, a quantization apparatus includes: a trellis-structured vector quantizer configured to quantize a first error vector between a first prediction vector and an N-dimension sub-vector, where N is a natural number greater than or equal to 2, and an intra-frame predictor configured to generate the first error vector from a quantized N-dimension sub-vector, wherein the intra-frame predictor is configured to use a prediction coefficient with an N×N matrix and to perform intra-frame prediction by using a quantized N-dimension sub-vector of a previous stage.

The apparatus may further include a vector quantizer configured to quantize a quantization error for the N-dimension sub-vector.

The apparatus may further include an inter-frame predictor configured to generate a prediction vector of a current frame from a quantized N-dimension sub-vector of a previous frame, wherein when the trellis-structured vector quantizer is configured to quantize a second error vector which corresponds to a difference between a prediction error vector and a second vector, the prediction error vector being obtained from the N-dimension sub-vector and the prediction vector of the current frame.

The apparatus may further include an inter-frame predictor configured to generate a prediction vector of a current frame from a quantized N-dimension sub-vector of a previous frame and a vector quantizer configured to quantize a quantization error for the prediction error vector, wherein when the trellis-structured vector quantizer is configured to quantize a second error vector which corresponds to a difference between a prediction error vector and a second vector, the prediction error vector being obtained from the N-dimension sub-vector and the prediction vector of the current frame.

According to one or more exemplary embodiments, a quantization apparatus includes: a first quantization module for performing quantization without an inter-frame prediction, and a second quantization module for performing quantization with an inter-frame prediction, wherein the first quantization module includes: a first trellis-structured vector quantizer configured to quantize a first error vector between a first prediction vector and an N-dimension sub-vector, where N is a natural number greater than or equal to 2, and a first intra-frame predictor configured to generate the first error vector from a quantized N-dimension sub-vector, wherein the first intra-frame predictor is configured to use a prediction coefficient with an N×N matrix and to perform intra-frame prediction by using a quantized N-dimension sub-vector of a previous stage.

The apparatus may further include an error vector quantizer configured to generate a quantized quantization error vector by quantizing a quantization error vector which corresponds to a difference between a quantized N-dimension linear vector of the current stage and an input N-dimension linear vector.

The intra-frame predictor may be configured to generate a prediction vector from a quantized prediction error vector, when the vector quantizer is configured to quantize a prediction error vector between an N-dimension linear vector of the current stage and a prediction vector of the current frame.

The apparatus may further include an error vector quantizer configured to quantize a quantization error for the prediction error vector, when the vector quantizer is configured to quantize a prediction error vector between an N-dimension linear vector of the current stage and a prediction vector of the current frame.

According to one or more exemplary embodiments, an inverse quantization apparatus includes: a trellis-structured inverse vector quantizer configured to inverse quantize a first quantization index for an N-dimension sub-vector, where N is a natural number greater than or equal to 2, and an intra-frame predictor configured to generate a prediction vector from a quantized N-dimension sub-vector, wherein the quantized N-dimension sub-vector corresponds to a result obtained by adding a quantized error vector from the trellis-structured inverse vector quantizer and the prediction vector, the intra-frame predictor is configured to use a prediction coefficient with an N×N matrix and to perform intra-frame prediction by using a quantized N-dimension sub-vector of a previous stage.

The inverse quantization apparatus may further include an inverse vector quantizer configured to quantize a second quantization index for an quantization error of the N-dimension sub-vector.

The inverse quantization apparatus may further include an inter-frame predictor configured to generate a prediction vector of a current frame from a quantized N-dimension sub-vector of a previous frame, wherein when the trellis-structured inverse vector quantizer is configured to inverse quantize a third quantization index for a quantization error vector between a N-dimension sub-vector and a prediction vector of the current frame.

The inverse quantization apparatus may further include an inter-frame predictor configured to generate a prediction vector of a current frame from a quantized N-dimension sub-vector of a previous frame and an inverse vector quantizer configured to quantize a fourth quantization index for an quantization error of the prediction error vector, wherein when the trellis-structured inverse vector quantizer is configured to inverse quantize a third quantization index for a quantization error vector between a N-dimension sub-vector and a prediction vector of the current frame.

Advantageous Effects

According to an exemplary embodiment, when a speech or audio signal is quantized by classifying the speech or audio signal into a plurality of coding modes according to a signal characteristic of speech or audio and allocating a various number of bits according to a compression ratio applied to each coding mode, the speech or audio signal may be more efficiently quantized by designing a quantizer having good performance at a low bit rate.

In addition, a used amount of a memory may be minimized by sharing a codebook of some quantizers when a quantization device for providing various bit rates is designed.

BRIEF DESCRIPTION OF DRAWINGS

These and/or other aspects will become apparent and more readily appreciated from the following description of the exemplary embodiments, taken in conjunction with the accompanying drawings in which.

MODE FOR INVENTION

Figure 1:
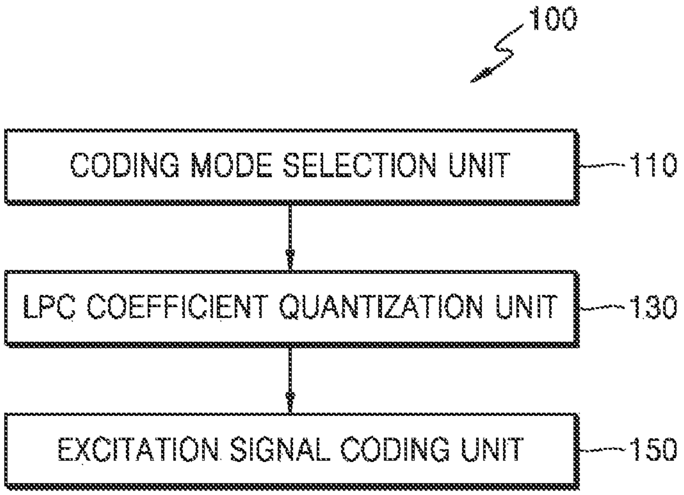
FIG. 1 is a block diagram of a sound coding apparatus according to an exemplary embodiment.

The inventive concept may allow various kinds of change or modification and various changes in form, and specific embodiments will be illustrated in drawings and described in detail in the specification. However, it should be understood that the specific embodiments do not limit the inventive concept to a specific disclosing form but include every modified, equivalent, or replaced one within the spirit and technical scope of the inventive concept. In the description of the inventive concept, when it is determined that a specific description of relevant well-known features may obscure the essentials of the inventive concept, a detailed description thereof is omitted.

Although terms, such as 'first' and 'second', can be used to describe various elements, the elements cannot be limited by the terms. The terms can be used to classify a certain element from another element.

The terminology used in the application is used only to describe specific embodiments and does not have any intention to limit the inventive concept. The terms used in this specification are those general terms currently widely used in the art, but the terms may vary according to the intention of those of ordinary skill in the art, precedents, or new technology in the art. Also, specified terms may be selected by the applicant, and in this case, the detailed meaning thereof will be described in the detailed description. Thus, the terms used in the specification should be understood not as simple names but based on the meaning of the terms and the overall description.

An expression in the singular includes an expression in the plural unless they are clearly different from each other in context. In the application, it should be understood that terms, such as 'include' and 'have', are used to indicate the existence of an implemented feature, number, step, operation, element, part, or a combination thereof without excluding in advance the possibility of the existence or addition of one or more other features, numbers, steps, operations, elements, parts, or combinations thereof.

Hereinafter, embodiments of the inventive concept will be described in detail with reference to the accompanying drawings, and like reference numerals in the drawings denote like elements, and thus their repetitive description will be omitted.

In general, a trellis coded quantizer (TCQ) quantizes an input vector by allocating one element to each TCQ stage, whereas a trellis coded vector quantizer (TCVQ) uses a structure of generating sub-vectors by dividing an entire input vector into sub-vectors and then allocating each sub-vector to a TCQ stage. When a quantizer is formed using one element, a TCQ is formed, and when a quantizer is formed using a sub-vector by combining a plurality of elements, a TCVQ is formed. Therefore, when a two-dimensional (2D) sub-vector is used, a total number of TCQ stages are the same size as obtained by dividing a size of an input vector by 2. Commonly, a speech/audio codec encodes an input signal in a frame unit, and a line spectral frequency (LSF) coefficient is extracted for each frame. An LSF coefficient has a vector form, and a dimension of 10 or 16 is used for the LSF coefficient. In this case, when considering a 2D TCVQ, the number of sub-vectors is 5 or 8.

FIG. 1 is a block diagram of a sound coding apparatus according to an exemplary embodiment.

A sound coding apparatus 100 shown in FIG. 1 may include a coding mode selection unit 110, a linear predictive coding (LPC) coefficient quantization unit 130, and a CELP coding unit 150. Each component may be implemented as at least one processor (not shown) by being integrated into at least one module. In an embodiment, since a sound may indicate audio or speech, or a mixed signal of audio and speech, hereinafter, a sound is referred to as a speech for convenience of description.

Referring to FIG. 1, the coding mode selection unit 110 may select one of a plurality of coding modes in correspondence with multiple rates. The coding mode selection unit 110 may determine a coding mode of a current frame by using a signal characteristic, voice activity detection (VAD) information, or a coding mode of a previous frame.

The LPC coefficient quantization unit 130 may quantize an LPC coefficient by using a quantizer corresponding to the selected coding mode and determine a quantization index representing the quantized LPC coefficient. The LPC coefficient quantization unit 130 may perform quantization by converting the LPC coefficient into another coefficient suitable for the quantization.

The excitation signal coding unit 150 may perform excitation signal coding according to the selected coding mode. For the excitation signal coding, a code-excited linear prediction (CELP) or algebraic CELP (ACELP) algorithm may be used. Representative parameters for encoding an LPC coefficient by a CELP scheme are an adaptive codebook index, an adaptive codebook gain, a fixed codebook index, a fixed codebook gain, and the like. The excitation signal coding may be carried out based on a coding mode corresponding to a characteristic of an input signal. For example, four coding modes, i.e., an unvoiced coding (UC) mode, a voiced coding (VC) mode, a generic coding (GC) mode, and a transition coding (TC) mode, may be used. The UC mode may be selected when a speech signal is an unvoiced sound or noise having a characteristic that is similar to that of the unvoiced sound. The VC mode may be selected when a speech signal is a voiced sound. The TC mode may be used when a signal of a transition period in which a characteristic of a speech signal sharply varies is encoded. The GC mode may be used to encode the other signals. The UC mode, the VC mode, the TC mode, and the GC mode follow the definition and classification criterion drafted in ITU-T G.718 but is not limited thereto. The excitation signal coding unit 150 may include an open-loop pitch search unit (not shown), a fixed codebook search unit (not shown), or a gain quantization unit (not shown), but components may be added to or omitted from the excitation signal coding unit 150 according to a coding mode. For example, in the VC mode, all the components described above are included, and in the UC mode, the open-loop pitch search unit is not used. The excitation signal coding unit 150 may be simplified in the GC mode and the VC mode when the number of bits allocated to quantization is large, i.e., in the case of a high bit rate. That is, by including the UC mode and the TC mode in the GC mode, the GC mode may be used for the UC mode and the TC mode. In the case of a high bit rate, an inactive coding (IC) mode and an audio coding (AC) mode may be further included. The excitation signal coding unit 150 may classify a coding mode into the GC mode, the UC mode, the VC mode, and the TC mode when the number of bits allocated to quantization is small, i.e., in the case of a low bit rate. In the case of a low bit rate, the IC mode and the AC mode may be further included. The IC mode may be selected for mute, and the AC mode may be selected when a characteristic of a speech signal is close to audio.

The coding mode may be further subdivided according to a bandwidth of a speech signal. The bandwidth of a speech signal may be classified into, for example, a narrowband (NB), a wideband (WB), a super wideband (SWB), and a full band (FB). The NB may have a bandwidth of 300-3400 Hz or 50-4000 Hz, the WB may have a bandwidth of 50-7000 Hz or 50-8000 Hz, the SWB may have a bandwidth of 50-14000 Hz or 50-16000 Hz, and the FB may have a bandwidth up to 20000 Hz. Herein, the numeric values related to the bandwidths are set for convenience and are not limited thereto. In addition, the classification of the bandwidth may also be set to be simpler or more complex.

When the types and number of coding modes are determined, it is necessary that a codebook is trained again using a speech signal corresponding to a determined coding mode.

The excitation signal coding unit 150 may additionally use a transform coding algorithm according to a coding mode. An excitation signal may be encoded in a frame or subframe unit.

Figure 2:
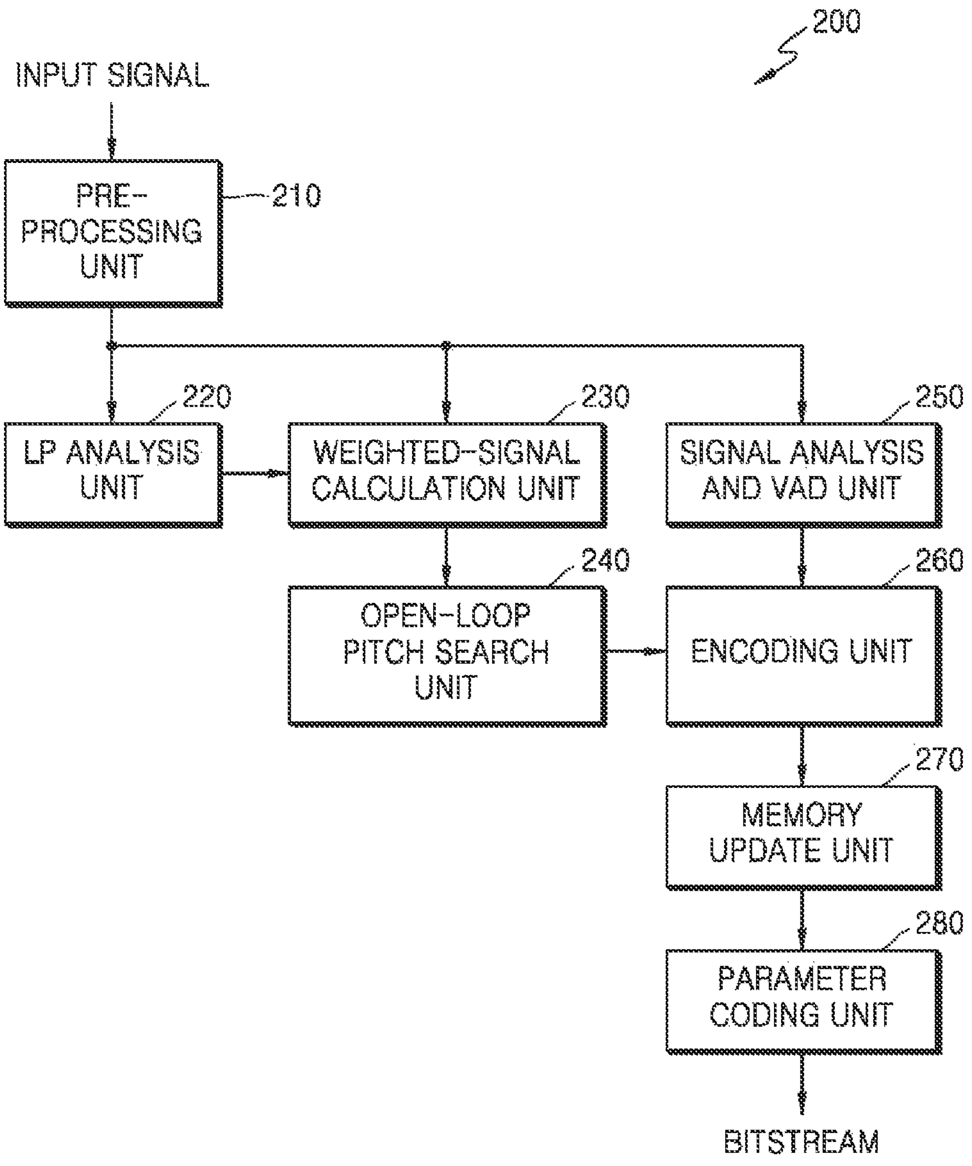
FIG. 2 is a block diagram of a sound coding apparatus according to another exemplary embodiment.

FIG. 2 is a block diagram of a sound coding apparatus according to another exemplary embodiment.

A sound coding apparatus 200 shown in FIG. 2 may include a pre-processing unit 210, an LP analysis unit 220, a weighted-signal calculation unit 230, an open-loop pitch search unit 240, a signal analysis and voice activity detection (VAD) unit 250, an encoding unit 260, a memory update unit 270, and a parameter coding unit 280. Each component may be implemented as at least one processor (not shown) by being integrated into at least one module. In the embodiment, since a sound may indicate audio or speech, or a mixed signal of audio and speech, hereinafter, a sound is referred to as a voice for convenience of description.

Referring to FIG. 2, the pre-processing unit 210 may pre-process an input speech signal. Through pre-processing processing, a undesired frequency component may be removed from the speech signal, or a frequency characteristic of the speech signal may be regulated so as to be advantageous in encoding. In detail, the pre-processing unit 210 may perform high-pass filtering, pre-emphasis, sampling conversion, or the like.

The LP analysis unit 220 may extract an LPC coefficient by performing an LP analysis on the pre-processed speech signal. In general, one LP analysis per frame is performed, but two or more LP analyses per frame may be performed for additional sound quality enhancement. In this case, one analysis is an LP for a frame-end, which is an existing LP analysis, and the other analyses may be LPs for a mid-subframe to enhance sound quality. Herein, a frame-end of a current frame indicates the last subframe among subframes constituting the current frame, and a frame-end of a previous frame indicates the last subframe among subframes constituting the previous frame. The mid-subframe indicates one or more subframes among subframes existing between the last subframe which is the frame-end of the previous frame and the last subframe which is the frame-end of the current frame. For example, one frame may consist of four subframes. A dimension of 10 is used for an LPC coefficient when an input signal is an NB, and a dimension of 16-20 is used for an LPC coefficient when an input signal is a WB, but the embodiment is not limited thereto.

The weighted-signal calculation unit 230 may receive the pre-processed speech signal and the extracted LPC coefficient and calculate a perceptual weighting filtered signal based on a perceptual weighting filter. The perceptual weighting filter may reduce quantization noise of the pre-processed speech signal within a masking range in order to use a masking effect of a human auditory structure.

The open-loop pitch search unit 240 may search an open-loop pitch by using the perceptual weighting filtered signal.

The signal analysis and VAD unit 250 may determine whether the input signal is an active speech signal by analyzing various characteristics including the frequency characteristic of the input signal.

The encoding unit 260 may determine a coding mode of the current frame by using a signal characteristic, VAD information or a coding mode of the previous frame, quantize an LPC coefficient by using a quantizer corresponding to the selected coding mode, and encode an excitation signal according to the selected coding mode. The encoding unit 260 may include the components shown in FIG. 1.

The memory update unit 270 may store the encoded current frame and parameters used during encoding for encoding of a subsequent frame.

The parameter coding unit 280 may encode parameters to be used for decoding at a decoding end and include the encoded parameters in a bitstream. Preferably, parameters corresponding to a coding mode may be encoded. The bitstream generated by the parameter coding unit 280 may be used for the purpose of storage or transmission.

Table 1 below shows an example of a quantization scheme and structure for four coding modes. A scheme of performing quantization without an inter-frame prediction can be named a safety-net scheme, and a scheme of performing quantization with an inter-frame prediction can be named a predictive scheme. In addition, a VQ stands for a vector quantizer, and a BC-TCQ stands for a block-constrained trellis coded quantizer.

TABLE 1

| Coding Mode | Quantization Scheme | Structure |
|---|---|---|
| UC, NB/WB | Satety-net | VQ + BC-TCQ |
| VC, NB/WB | Satety-net | VQ + BC-TCQ |
| | Predictive | Inter-frame prediction + BC-TCQ with intra-frame prediction |
| GC, NB/WB | Satety-net | VQ + BC-TCQ |
| | Predictive | Inter-frame prediction + BC-TCQ with intra-frame prediction |
| TC, NB/WB | Satety-net | VQ + BC-TCQ |

A BC-TCVQ stands for a block-constrained trellis coded vector quantizer. A TCVQ allows a vector codebook and a branch label by generalizing a TCQ. Main features of the TCVQ are to partition VQ symbols of an expanded set into subsets and to label trellis branches with these subsets. The TCVQ is based on a rate 1/2 convolution code, which has $N=2^{\nu}$ trellis states, and has two branches entering and leaving each trellis state. When M source vectors are given, a minimum distortion path is searched for using a Viterbi algorithm. As a result, a best trellis path may begin in any of N initial states and end in any of N terminal states. A codebook in the TCVQ has $2^{(R+R')L}$ vector codewords. Herein, since the codebook has $2^{R'L}$ times as many codewords as a nominal rate R VQ, R' may be a codebook expansion factor. An encoding operation is simply described as follows. First, for each input vector, distortion corresponding to the closest codeword in each subset is searched for, and a minimum distortion path through a trellis is searched for using the Viterbi algorithm by putting, as searched distortion, a branch metric for a branch labeled to a subset S. Since the BC-TCVQ requires one bit for each source sample to designate a trellis path, the BC-TCVQ has low complexity. A BC-TCVQ structure may have $2^k$ initial trellis states and $2^{\nu-k}$ terminal states for each allowed initial trellis state when $0 \le k \le \nu$. Single Viterbi encoding starts from an allowed initial trellis state and ends at a vector stage m-k. To specify an initial state, k bits are required, and to designate a path to the vector stage m-k, m-k bits are required. The unique terminating path depending on an initial trellis state is pre-specified for each trellis state at the vector stage m-k through a vector stage m. Regardless of a value of k, m bits are required to specify an initial trellis state and a path through a trellis.

A BC-TCVQ for the VC mode at an internal sampling frequency of 16 KHz may use 16-state and 8-stage TCVQ having an N-dimension, for example, a 2D vector. LSF sub-vectors having two elements may be allocated to each stage. Table 2 below shows initial states and terminal states for a 16-state BC-TCVQ. Herein, k and v denotes 2 and 4, respectively, and four bits for an initial state and a terminal state are used.

TABLE 2

| Initial state | Terminal state |
|---|---|
| 0 | 0, 1, 2, 3 |
| 4 | 4, 5, 6, 7 |
| 8 | 8, 9, 10, 11 |
| 12 | 12, 13, 14, 15 |

A coding mode may vary according to an applied bit rate. As described above, to quantize an LPC coefficient at a high bit rate using two coding modes, 40 or 41 bits for each frame may be used in the GC mode, and 46 bits for each frame may be used in the TC mode.

Figure 3:
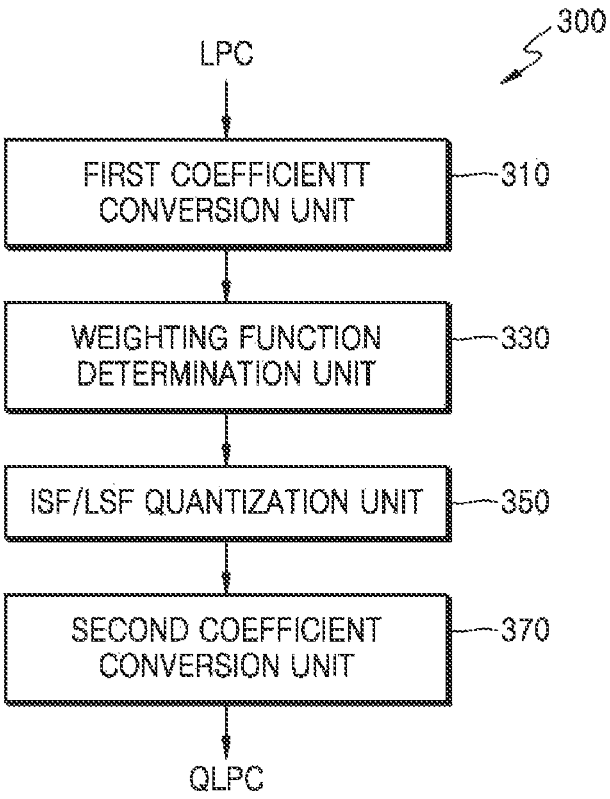
FIG. 3 is a block diagram of a linear predictive coding (LPC) quantization unit according to an exemplary embodiment.

FIG. 3 is a block diagram of an LPC coefficient quantization unit according to an exemplary embodiment.

An LPC coefficient quantization unit 300 shown in FIG. 3 may include a first coefficient conversion unit 310, a weighting function determination unit 330, an ISF/LSF quantization unit 350, and a second coefficient conversion unit 379. Each component may be implemented as at least one processor (not shown) by being integrated into at least one module. A un-quantized LPC coefficient and coding mode information may be provided as inputs to the LPC coefficient quantization unit 300.

Referring to FIG. 3, the first coefficient conversion unit 310 may convert an LPC coefficient extracted by LP-analyzing a frame-end of a current frame or a previous frame of a speech signal into a coefficient of a different form. For example, the first coefficient conversion unit 310 may convert the LPC coefficient of the frame-end of the current frame or the previous frame into any one form of an LSF coefficient and an ISF coefficient. In this case, the ISF coefficient or the LSF coefficient indicates an example of a form in which the LPC coefficient can be more easily quantized.

The weighting function determination unit 330 may determine a weighting function for the ISF/LSF quantization unit 350 by using the ISF coefficient or the LSF coefficient converted from the LPC coefficient. The determined weighting function may be used in an operation of selecting a quantization path or a quantization scheme or searching for a codebook index with which a weighted error is minimized in quantization. For example, the weighting function determination unit 330 may determine a final weighting function by combining a magnitude weighting function, a frequency weighting function and a weighting function based on a position of the ISF/LSF coefficient.

In addition, the weighting function determination unit 330 may determine a weighting function by taking into account at least one of a frequency bandwidth, a coding mode, and spectrum analysis information. For example, the weighting function determination unit 330 may derive an optimal weighting function for each coding mode. Alternatively, the weighting function determination unit 330 may derive an optimal weighting function according to a frequency bandwidth of a speech signal. Alternatively, the weighting function determination unit 330 may derive an optimal weighting function according to frequency analysis information of a speech signal. In this case, the frequency analysis information may include spectral tilt information. The weighting function determination unit 330 is described in detail below.

The ISF/LSF quantization unit 350 may obtain an optimal quantization index according to an input coding mode. In detail, the ISF/LSF quantization unit 350 may quantize the ISF coefficient or the LSF coefficient converted from the LPC coefficient of the frame-end of the current frame. When an input signal is the UC mode or the TC mode corresponding to a non-stationary signal, the ISF/LSF quantization unit 350 may quantize the input signal by only using the safety-net scheme without an inter-frame prediction, and when an input signal is the VC mode or the GC mode corresponding to a stationary signal, the ISF/LSF quantization unit 350 may determine an optimal quantization scheme in consideration of a frame error by switching the predictive scheme and the safety-net scheme.

The ISF/LSF quantization unit 350 may quantize the ISF coefficient or the LSF coefficient by using the weighting function determined by the weighting function determination unit 330. The ISF/LSF quantization unit 350 may quantize the ISF coefficient or the LSF coefficient by using the weighting function determined by the weighting function determination unit 330 to select one of a plurality of quantization paths. An index obtained as a result of the quantization may be used to obtain the quantized ISF (QISF) coefficient or the quantized LSF (QLSF) coefficient through an inverse quantization operation.

The second coefficient conversion unit 370 may convert the QISF coefficient or the QLSF coefficient into a quantized LPC (QLPC) coefficient.

Hereinafter, a relationship between vector quantization of LPC coefficients and a weighting function is described.

The vector quantization indicates an operation of selecting a codebook index having the least error by using a squared error distance measure based on the consideration that all entries in a vector have the same importance. However, for the LPC coefficients, since all the coefficients have different importance, when errors of important coefficients are reduced, perceptual quality of a finally synthesized signal may be improved. Therefore, when the LSF coefficients are quantized, a decoding apparatus may select an optimal codebook index by applying a weighting function representing the importance of each LPC coefficient to a squared error distance measure, thereby improving the performance of a synthesized signal.

According to an embodiment, a magnitude weighting function about what is actually affected to a spectral envelope by each ISF or LSF may be determined using frequency information of the ISF and the LSF and an actual spectral magnitude. According to an embodiment, additional quantization efficiency may be obtained by combining a frequency weighting function in which a perceptual characteristic of a frequency domain and a formant distribution are considered and the magnitude weighting function. In this case, since an actual magnitude in the frequency domain is used, envelope information of whole frequencies may be well reflected, and a weight of each ISF or LSF coefficient may be accurately derived. According to an embodiment, additional quantization efficiency may be obtained by combining a weighting function based on position information of LSF coefficients or ISF coefficients with the magnitude weighting function and the frequency weighting function.

According to an embodiment, when an ISF or an LSF converted from an LPC coefficient is vector-quantized, if the importance of each coefficient is different, a weighting function indicating which entry is relatively more important in a vector may be determined. In addition, by determining a weighting function capable of assigning a higher weight to a higher-energy portion by analyzing a spectrum of a frame to be encoded, accuracy of the encoding may be improved. High energy in a spectrum indicates a high correlation in a time domain.

In Table 1, an optimal quantization index for a VQ applied to all modes may be determined as an index for minimizing $E_{werr}(p)$ of Equation 1.

$$E_{werr}(p) = \sum_{i=0}^{15} w_{end}(i)[r(i) - c_s^p(i)]^2 \quad \text{[Equation 1]}$$

In Equation 1, w(i) denotes a weighting function, r(i) denotes an input of a quantizer, and c(i) denotes an output of the quantizer and is to obtain an index for minimizing weighted distortion between two values.

Next, a distortion measure used by a BC-TCQ basically follows a method disclosed in U.S. Pat. No. 7,630,890. In this case, a distortion measure d(x, y) may be represented by Equation 2.

$$d(x, y) = \frac{1}{N}\sum_{k=1}^{N}(x_k - y_k)^2 \quad \text{[Equation 2]}$$

According to an embodiment, a weighting function may be applied to the distortion measure d(x, y). Weighted distortion may be obtained by extending a distortion measure used for a BC-TCQ in U.S. Pat. No. 7,630,890 to a measure for a vector and then applying a weighting function to the extended measure. That is, an optimal index may be determined by obtaining weighted distortion as represented in Equation 3 below at all stages of a BC-TCVQ.

$$d_u(x, y) = \frac{1}{N}\sum_{k=1}^{N} w_k(x_k - y_k)^2 \quad \text{[Equation 3]}$$

The ISF/LSF quantization unit 350 may perform quantization according to an input coding mode, for example, by switching a lattice vector quantizer (LVQ) and a BC-TCVQ. If a coding mode is the GC mode, the LVQ may be used, and if the coding mode is the VC mode, the BC-TCVQ may be used. An operation of selecting a quantizer when the LVQ and the BC-TCVQ are mixed is described as follows. First, bit rates for encoding may be selected. After selecting the bit rates for encoding, bits for an LPC quantizer corresponding to each bit rate may be determined. Thereafter, a bandwidth of an input signal may be determined. A quantization scheme may vary according to whether the input signal is an NB or a WB. In addition, when the input signal is a WB, it is necessary that it is additionally determined whether an upper limit of a bandwidth to be actually encoded is 6.4 KHz or 8 KHz. That is, since a quantization scheme may vary according to whether an internal sampling frequency is 12.8 KHz or 16 KHz, it is necessary to check a bandwidth. Next, an optimal coding mode within a limit of usable coding modes may be determined according to the determined bandwidth. For example, four coding modes (the UC, the VC, the GC, and the TC) are usable, but only three modes (the VC, the GC, and the TC) may be used at a high bit rate (for example, 9.6 Kbit/s or above). A quantization scheme, e.g., one of the LVQ and the BC-TCVQ, is selected based on a bit rate for encoding, a bandwidth of an input signal, and a coding mode, and an index quantized based on the selected quantization scheme is output.

According to an embodiment, it is determined whether a bit rate corresponds to between 24.4 Kbps and 65 Kbps, and if the bit rate does not correspond to between 24.4 Kbps and 65 Kbps, the LVQ may be selected. Otherwise, if the bit rate corresponds to between 24.4 Kbps and 65 Kbps, it is determined whether a bandwidth of an input signal is an NB, and if the bandwidth of the input signal is an NB, the LVQ may be selected. Otherwise, if the bandwidth of the input signal is not an NB, it is determined whether a coding mode is the VC mode, and if the coding mode is the VC mode, the BC-TCVQ may be used, and if the coding mode is not the VC mode, the LVQ may be used.

According to another embodiment, it is determined whether a bit rate corresponds to between 13.2 Kbps and 32 Kbps, and if the bit rate does not correspond to between 13.2 Kbps and 32 Kbps, the LVQ may be selected. Otherwise, if the bit rate corresponds to between 13.2 Kbps and 32 Kbps, it is determined whether a bandwidth of an input signal is a WB, and if the bandwidth of the input signal is not a WB, the LVQ may be selected. Otherwise, if the bandwidth of the input signal is a WB, it is determined whether a coding mode is the VC mode, and if the coding mode is the VC mode, the BC-TCVQ may be used, and if the coding mode is not the VC mode, the LVQ may be used.

According to an embodiment, an encoding apparatus may determine an optimal weighting function by combining a magnitude weighting function using a spectral magnitude corresponding to a frequency of an ISF coefficient or an LSF coefficient converted from an LPC coefficient, a frequency weighting function in which a perceptual characteristic of an input signal and a formant distribution are considered, a weighting function based on positions of LSF coefficients or ISF coefficients.

Figure 4:
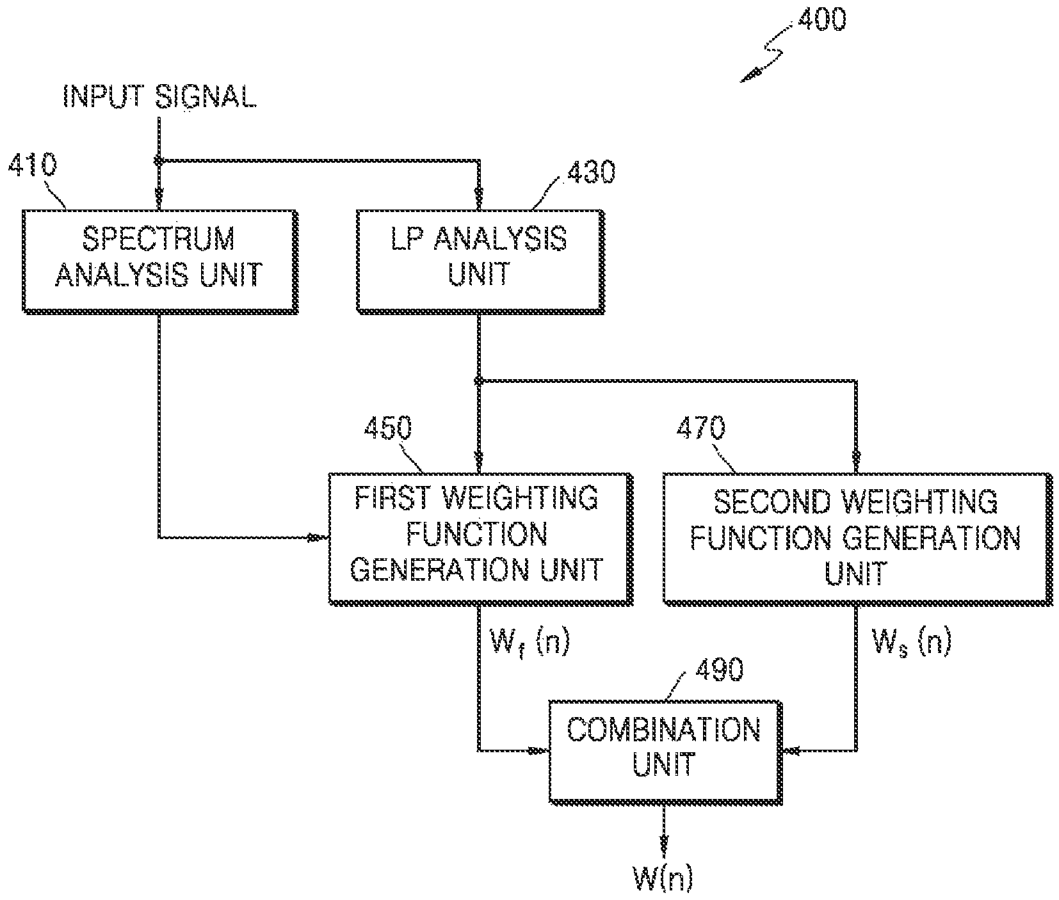
FIG. 4 is a detailed block diagram of a weighting function determination unit of FIG. 3, according to an exemplary embodiment.

FIG. 4 is a block diagram of the weighting function determination unit of FIG. 3, according to an exemplary embodiment.

A weighting function determination unit 400 shown in FIG. 4 may include a spectrum analysis unit 410, an LP analysis unit 430, a first weighting function generation unit 450, a second weighting function generation unit 470, and a combination unit 490. Each component may be integrated and implemented as at least one processor.

Referring to FIG. 4, the spectrum analysis unit 410 may analyze a characteristic of the frequency domain for an input signal through a time-to-frequency mapping operation. Herein, the input signal may be a pre-processed signal, and the time-to-frequency mapping operation may be performed using fast Fourier transform (FFT), but the embodiment is not limited thereto. The spectrum analysis unit 410 may provide spectrum analysis information, for example, spectral magnitudes obtained as a result of FFT. Herein, the spectral magnitudes may have a linear scale. In detail, the spectrum analysis unit 410 may generate spectral magnitudes by performing 128-point FFT. In this case, a bandwidth of the spectral magnitudes may correspond to a range of 0-6400 Hz. When an internal sampling frequency is 16 KHz, the number of spectral magnitudes may extend to 160. In this case, spectral magnitudes for a range of 6400-8000 Hz are omitted, and the omitted spectral magnitudes may be generated by an input spectrum. In detail, the omitted spectral magnitudes for the range of 6400-8000 Hz may be replaced using the last 32 spectral magnitudes corresponding to a bandwidth of 4800-6400 Hz. F or example, a mean value of the last 32 spectral sizes may be used.

The LP analysis unit 430 may generate an LPC coefficient by LP-analyzing the input signal. The LP analysis unit 430 may generate an ISF or LSF coefficient from the LPC coefficient.

The first weighting function generation unit 450 may obtain a magnitude weighting function and a frequency weighting function based on spectrum analysis information of the ISF or LSF coefficient and generate a first weighting function by combining the magnitude weighting function and the frequency weighting function. The first weighting function may be obtained based on FFT, and a large weight may be allocated as a spectral magnitude is large. For example, the first weighting function may be determined by normalizing the spectrum analysis information, i.e., spectral magnitudes, so as to meet an ISF or LSF band and then using a magnitude of a frequency corresponding to each ISF or LSF coefficient.

The second weighting function generation unit 470 may determine a second weighting function based on interval or position information of adjacent ISF or LSF coefficients. According to an embodiment, the second weighting function related to spectrum sensitivity may be generated from two ISF or LSF coefficients adjacent to each ISF or LSF coefficient. Commonly, ISF or LSF coefficients are located on a unit circle of a Z-domain and are characterized in that when an interval between adjacent ISF or LSF coefficients is narrower than that of the surroundings, a spectral peak appears. As a result, the second weighting function may be used to approximate spectrum sensitivity of LSF coefficients based on positions of adjacent LSF coefficients. That is, by measuring how close adjacent LSF coefficients are located, a density of the LSF coefficients may be predicted, and since a signal spectrum may have a peak value near a frequency at which dense LSF coefficients exist, a large weight may be allocated. Herein, to increase accuracy when the spectrum sensitivity is approximated, various parameters for the LSF coefficients may be additionally used when the second weighting function is determined.

As described above, an interval between ISF or LSF coefficients and a weighting function may have an inverse proportional relationship. Various embodiments may be carried out using this relationship between an interval and a weighting function. For example, an interval may be represented by a negative value or represented as a denominator. As another example, to further emphasis an obtained weight, each element of a weighting function may be multiplied by a constant or represented as a square of the element. As another example, a weighting function secondarily obtained by performing an additional computation, e.g., a square or a cube, of a primarily obtained weighting function may be further reflected.

An example of deriving a weighting function by using an interval between ISF or LSF coefficients is as follows.

According to an embodiment, a second weighting function $W_s(n)$ may be obtained by Equation 4 below.

$$w_i = 3.347 - \frac{1.547}{450} d_i, \quad \text{for } d_i < 450 = 1.8 \cdot \frac{0.8}{1050}(d_i - 450), \quad \text{otherwise where } d_i = lsf_{i+1} - lsf_{i-1} \qquad \text{[Equation 4]}$$

In Equation 4, $lsf_{i-1}$ and $lsf_{i+1}$ denote LSF coefficients adjacent to a current LSF coefficient.

According to another embodiment, the second weighting function $W_s(n)$ may be obtained by Equation 5 below.

$$W_s(n) = \frac{1}{lsf_n - lsf_{n-1}} + \frac{1}{lsf_{n+1} - lsf_n}, \; n = 0, \ldots, M-1 \qquad \text{[Equation 5]}$$

In Equation 5, $lsf_n$ denotes a current LSF coefficient, $lsf_{n-1}$ and $lsf_{n+1}$ denote adjacent LSF coefficients, and M is a dimension of an LP model and may be 16. For example, since LSF coefficients span between 0 and π, first and last weights may be calculated based on $lsf_0=0$ and $lsf_M=\pi$.

The combination unit 490 may determine a final weighting function to be used to quantize an LSF coefficient by combining the first weighting function and the second weighting function. In this case, as a combination scheme, various schemes, such as a scheme of multiplying the first weighting function and the second weighting function, a scheme of multiplying each weighting function by a proper ratio and then adding the multiplication results, and a scheme of multiplying each weight by a value predetermined using a lookup table or the like and then adding the multiplication results, may be used.

Figure 5:
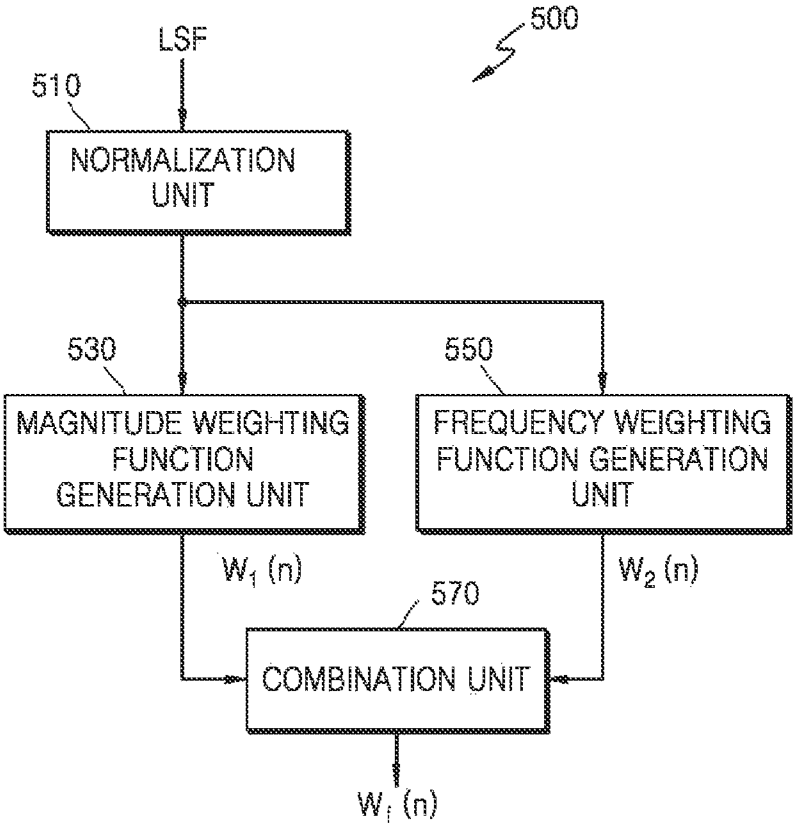
FIG. 5 is a detailed block diagram of a first weighting function generation unit of FIG. 4, according to an exemplary embodiment.

FIG. 5 is a detailed block diagram of the first weighting function generation unit of FIG. 4, according to an exemplary embodiment.

A first weighting function generation unit 500 shown in FIG. 5 may include a normalization unit 510, a size weighting function generation unit 530, a frequency weighting function generation unit 550, and a combination unit 570. Herein, for convenience of description, LSF coefficients are used for an example as an input signal of the first weighting function generation unit 500.

Referring to FIG. 5, the normalization unit 510 may normalize the LSF coefficients in a range of 0 to K−1. The LSF coefficients may commonly have a range of 0 to π. For an internal sampling frequency of 12.8 KHz, K may be 128, and for an internal sampling frequency of 16.4 KHz, K may be 160.

The magnitude weighting function generation unit 530 may generate a magnitude weighting function $W_1(n)$ based on spectrum analysis information for the normalized LSF coefficient. According to an embodiment, the magnitude weighting function may be determined based on a spectral magnitude of the normalized LSF coefficient.

In detail, the magnitude weighting function may be determined using a spectral bin corresponding to a frequency of the normalized LSF coefficient and two neighboring spectral bins located at the left and the right of, e.g., one previous or subsequent to, a corresponding spectral bin. Each magnitude weighting function $W_1(n)$ related to a spectral envelope may be determined based on Equation 6 below by extracting a maximum value among magnitudes of three spectral bins.

$$W_1(n) = (\sqrt{w_f(n) - \mathrm{Min}}) + 2, \text{ for } n = 0, \ldots, M-1 \qquad \text{[Equation 6]}$$

In Equation 6, Min denotes a minimum value of $w_f(n)$, and $w_f(n)$ may be defined by 10 $\log(E_{max}(n))$ (herein, n=0, . . . , M−1). Herein, M denotes 16, and $E_{max}(n)$ denotes a maximum value among magnitudes of three spectral bins for each LSF coefficient.

The frequency weighting function generation unit 550 may generate a frequency weighting function $W_2(n)$ based on frequency information for the normalized LSF coefficient. According to an embodiment, the frequency weighting function may be determined using a perceptual characteristic of an input signal and a formant distribution. The frequency weighting function generation unit 550 may extract the perceptual characteristic of the input signal according to a bark scale. In addition, the frequency weighting function generation unit 550 may determine a weighting function for each frequency based on a first formant of a distribution of formants. The frequency weighting function may exhibit a relatively low weight at a very low frequency and a high frequency and exhibit the same sized weight in a certain frequency period, e.g., a period corresponding to a first formant, at a low frequency. The frequency weighting function generation unit 550 may determine the frequency weighting function according to an input bandwidth and a coding mode.

The combination unit 570 may determine an FFT-based weighting function $W_f(n)$ by combining the magnitude weighting function $W_1(n)$ and the frequency weighting function $W_2(n)$. The combination unit 570 may determine a final weighting function by multiplying or adding the magnitude weighting function and the frequency weighting function. For example, the FFT-based weighting function $W_f(n)$ for frame-end LSF quantization may be calculated based on Equation 7 below.

$$W_{f(n)}=W_1(n)\cdot W_2(n),\ \text{for } n=0, \ldots, M-1 \qquad \text{[Equation 7]}$$

Figure 6:
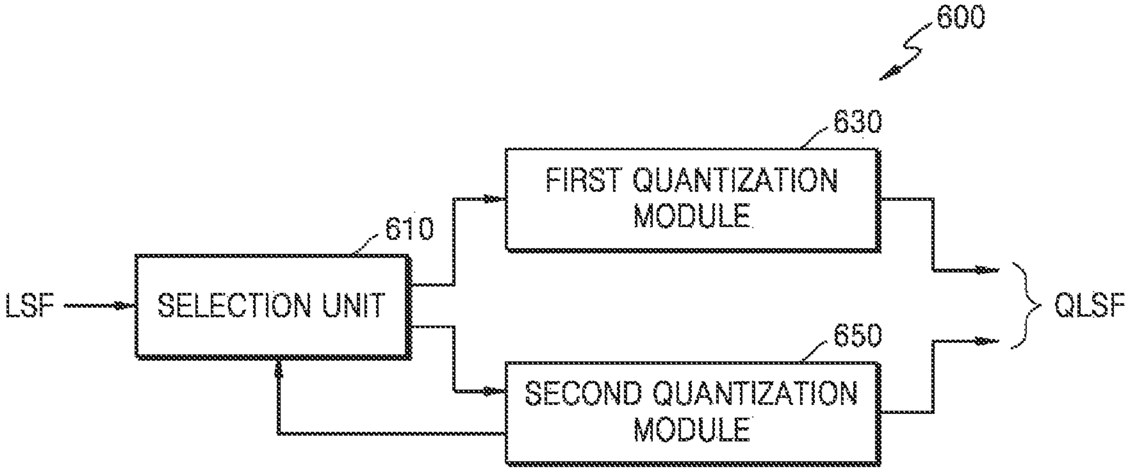
FIG. 6 is a block diagram of an LPC coefficient quantization unit according to an exemplary embodiment.

FIG. 6 is a block diagram of an LPC coefficient quantization unit according to an exemplary embodiment.

An LPC coefficient quantization unit 600 shown in FIG. 6 may include a selection unit 610, a first quantization module 630, and a second quantization module 650.

Referring to FIG. 6, the selection unit 610 may select one of quantization without an inter-frame prediction and quantization with an inter-frame prediction based on a predetermined criterion. Herein, as the predetermined criterion, a prediction error of a un-quantized LSF may be used. The prediction error may be obtained based on an inter-frame prediction value.

The first quantization module 630 may quantize an input signal provided through the selection unit 610 when the quantization without an inter-frame prediction is selected.

The second quantization module 650 may quantize an input signal provided through the selection unit 610 when the quantization with an inter-frame prediction is selected.

The first quantization module 630 may perform quantization without an inter-frame prediction and may be named the safety-net scheme. The second quantization module 650 may perform quantization with an inter-frame prediction and may be named the predictive scheme.

Accordingly, an optimal quantizer may be selected in correspondence with various bit rates from a low bit rate for a highly efficient interactive voice service to a high bit rate for providing a service of differentiated quality.

Figure 7:
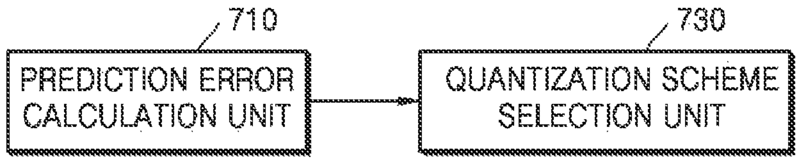
FIG. 7 is a block diagram of a selection unit of FIG. 6, according to an exemplary embodiment.

FIG. 7 is a block diagram of the selection unit of FIG. 6, according to an exemplary embodiment.

A selection unit 700 shown in FIG. 7 may include a prediction error calculation unit 710 and a quantization scheme selection unit 730. Herein, the prediction error calculation unit 710 may be included in the second quantization module 650 of FIG. 6.

Referring to FIG. 7, the prediction error calculation unit 710 may calculate a prediction error based on various methods by receiving, as inputs, an inter-frame prediction value p(n), a weighting function w(n), and an LSF coefficient z(n) from which a DC value has been removed. First, the same inter-frame predictor as used in the predictive scheme of the second quantization module 650 may be used. Herein, any one of an auto-regressive (AR) method and a moving average (MA) method may be used. As a signal z(n) of a previous frame for an inter-frame prediction, a quantized value or a un-quantized value may be used. In addition, when a prediction error is obtained, a weighting function may be applied or may not be applied. Accordingly, a total of eight combinations may be obtained, and four of the eight combinations are as follows.

First, a weighted AR prediction error using a quantized signal z(n) of a previous frame may be represented by Equation 8 below.

$$E_p=\sum_{i=0}^{M-1} w_{end}(i)(z_k(i)-\hat{z}_{k-1}(i)\rho(i))^2 \qquad \text{[Equation 8]}$$

Second, an AR prediction error using the quantized signal z(n) of the previous frame may be represented by Equation 9 below.

$$E_p=\sum_{i=0}^{M-1} (z_k(i)-\hat{z}_{k-1}(i)\rho(i))^2 \qquad \text{[Equation 9]}$$

Third, a weighted AR prediction error using a signal z(n) of the previous frame may be represented by Equation 10 below.

$$E_p=\sum_{i=0}^{M-1} w_{end}(i)(z_k(i)-z_{k-1}(i)\rho(i))^2 \qquad \text{[Equation 10]}$$

Fourth, an AR prediction error using the signal z(n) of the previous frame may be represented by Equation 11 below.

$$E_p=\sum_{i=0}^{M-1} (z_k(i)-z_{k-1}(i)\rho(i))^2 \qquad \text{[Equation 11]}$$

Herein, M denotes a dimension of an LSF, and when a bandwidth of an input speech signal is a WB, 16 is commonly used for M, and p(i) denotes a predicted coefficient of the AR method. As described above, a case in which information about an immediately previous frame is used is usual, and a quantization scheme may be determined using a prediction error obtained as described above.

If a prediction error is greater than a predetermined threshold, this may suggest that a current frame tends to be non-stationary. In this case, the safety-net scheme may be used. Otherwise, the predictive scheme is used, and in this case, it may be restrained such that the predictive scheme is not continuously selected.

According to an embodiment, to prepare for a case in which information about a previous frame does not exist due to the occurrence of a frame error on the previous frame, a second prediction error may be obtained using a previous frame of the previous frame, and a quantization scheme may be determined using the second prediction error. In this case, compared with the first case described above, the second prediction error may be represented by Equation 12 below.

$$E_{p2}=\sum_{i=0}^{M-1} w_{end}(i)(z_k(i)-\hat{z}_{k-2}(i)\rho(i))^2 \qquad \text{[Equation 12]}$$

The quantization scheme selection unit 730 may determine a quantization scheme for a current frame by using the prediction error obtained by the prediction error calculation unit 710. In this case, the coding mode obtained by the coding mode determination unit (110 of FIG. 1) may be further taken into account. According to an embodiment, in the VC mode or the GC mode, the quantization scheme selection unit 730 may operate.

Figure 8:
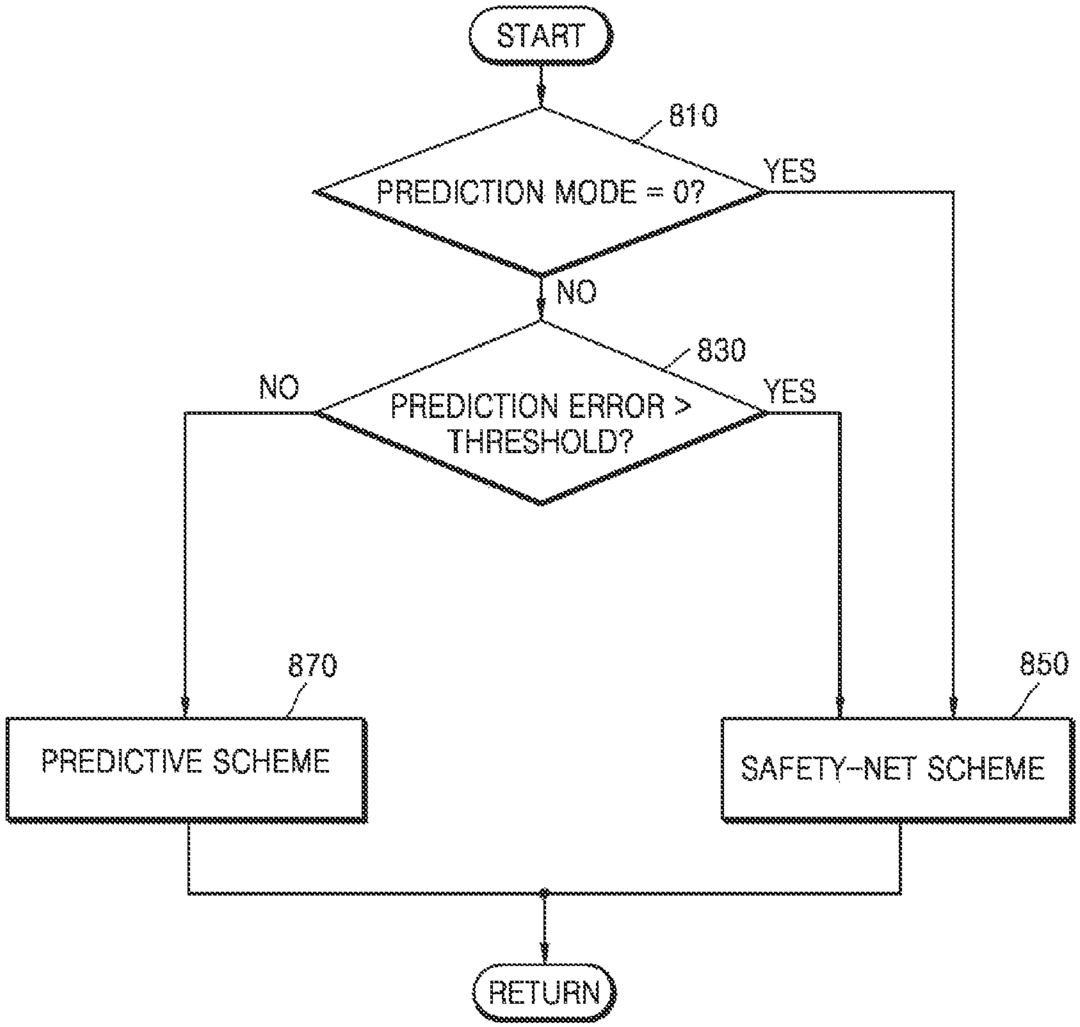
FIG. 8 is a flowchart for describing an operation of the selection unit of FIG. 6, according to an exemplary embodiment.

FIG. 8 is a flowchart for describing an operation of the selection unit of FIG. 6, according to an embodiment. When a prediction mode has a value of 0, this indicates that the safety-net scheme is always used, and when the prediction mode has a value except for 0, this indicates that a quantization scheme is determined by switching the safety-net scheme and the predictive scheme. Examples of a coding mode in which the safety-net scheme is always used may be the UC mode and the TC mode. In addition, examples of a coding mode in which the safety-net scheme and the predictive scheme are switched and used may be the VC mode and the GC mode.

Referring to FIG. 8, in operation 810, it is determined whether a prediction mode of a current frame is 0. As a result of the determination in operation 810, if the prediction mode is 0, e.g., if the current frame has high variability as in the UC mode or the TC mode, since a prediction between frames is difficult, the safety-net scheme, i.e., the first quantization module 630, may be always selected in operation 850.

Otherwise, as a result of the determination in operation 810, if the prediction mode is not 0, one of the safety-net scheme and the predictive scheme may be determined as a quantization scheme in consideration of a prediction error. To this end, in operation 830, it is determined whether the prediction error is greater than a predetermined threshold. Herein the threshold may be determined in advance through experiments or simulations. For example, for a WB of which a dimension is 16, the threshold may be determined as, for example, 3,784,536.3. However, it may be restrained such that the predictive scheme is not continuously selected.

As a result of the determination in operation 830, if the prediction error is greater than or equal to the threshold, the safety-net scheme may be selected in operation 850. Otherwise, as a result of the determination in operation 830, if the prediction error is less than the threshold, the predictive scheme may be selected in operation 870.

FIGS. 9A through 9E are block diagrams illustrating various implemented examples of the first quantization module shown in FIG. 6. According to an embodiment, it is assumed that a 16-dimension LSF vector is used as an input of the first quantization module.

Figure 9A:
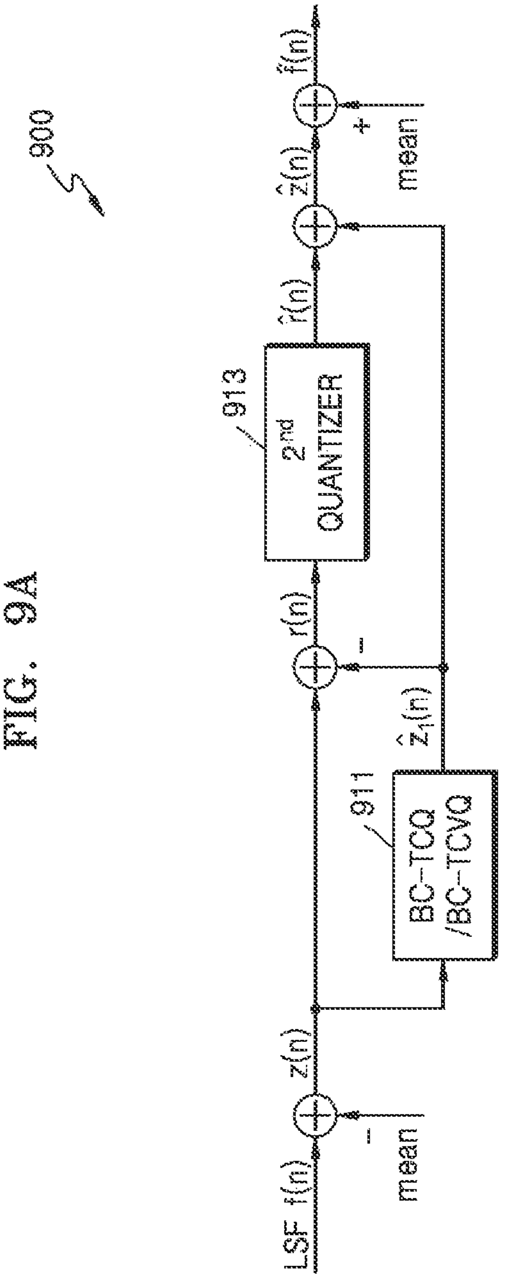
FIGS. 9A through 9E are block diagrams illustrating various implemented examples of a first quantization module shown in FIG. 6.

A first quantization module 900 shown in FIG. 9A may include a first quantizer 911 for quantizing an outline of an entire input vector by using a TCQ and a second quantizer 913 for additionally quantizing a quantization error signal. The first quantizer 911 may be implemented using a trellis-structured quantizer, such as a TCQ, a TCVQ, a BC-TCQ, or a BC-TCVQ. The second quantizer 913 may be implemented using a vector quantizer or a scalar quantizer but is not limited thereto. To improve the performance while minimizing a memory size, a split vector quantizer (SVQ) may be used, or to improve the performance, a multi-stage vector quantizer (MSVQ) may be used. When the second quantizer 913 is implemented using an SVQ or an MSVQ, if there is complexity to spare, two or more candidates may be stored, and then a soft decision technique of performing an optimal codebook index search may be used.

An operation of the first quantizer 911 and the second quantizer 913 is as follows.

First, a signal z(n) may be obtained by removing a previously defined mean value from a un-quantized LSF coefficient. The first quantizer 911 may quantize or inverse-quantize an entire vector of the signal z(n). A quantizer used herein may be, for example, a TCQ, a TCVQ, a BC-TCQ or a BC-TCVQ. To obtain a quantization error signal, a signal r(n) may be obtained using a difference value between the signal z(n) and an inverse-quantized signal. The signal r(n) may be provided as an input of the second quantizer 913. The second quantizer 913 may be implemented using an SVQ, an MSVQ, or the like. A signal quantized by the second quantizer 913 becomes a quantized value z(n) after being inverse-quantized and then added to a result inverse-quantized by the first quantizer 911, and a quantized LSF value may be obtained by adding the mean value to the quantized value z(n).

Figure 9B:
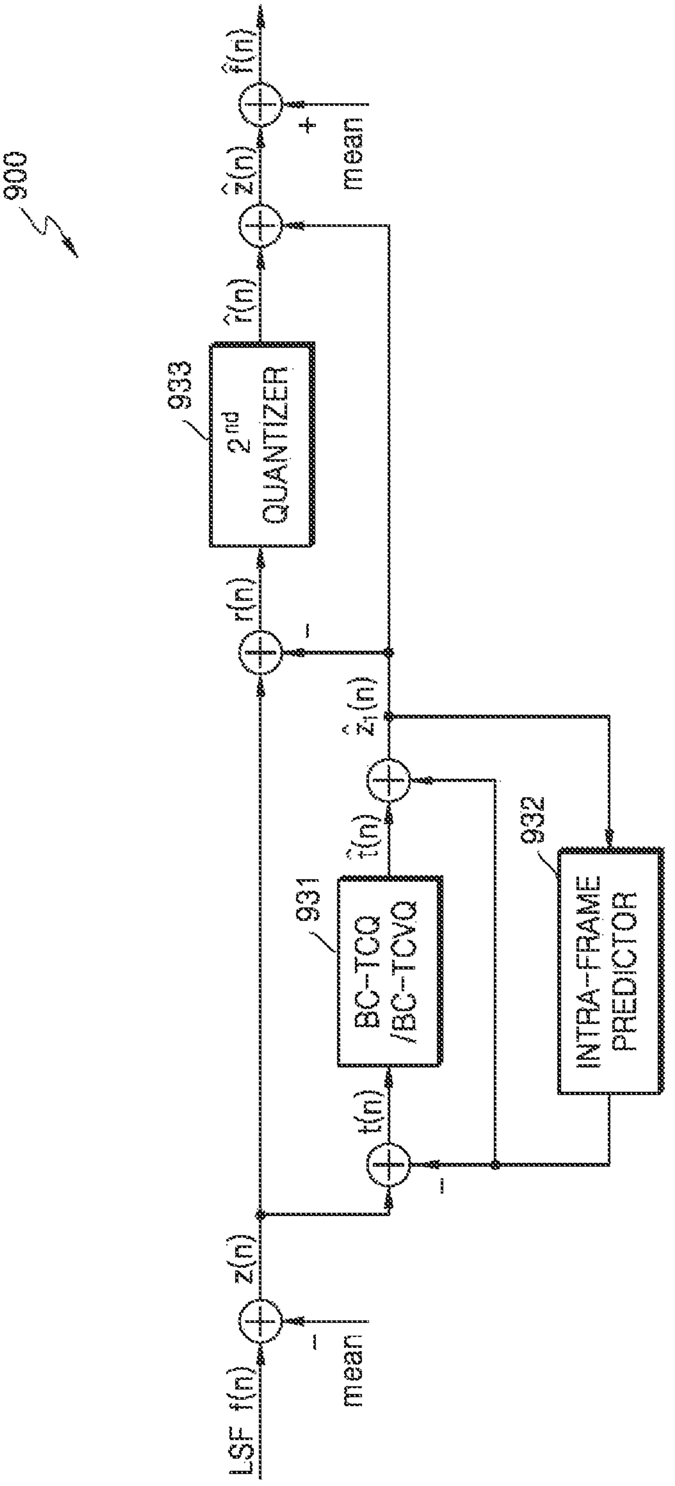

The first quantization module 900 shown in FIG. 9B may further include an intra-frame predictor 932 in addition to a first quantizer 931 and a second quantizer 933. The first quantizer 931 and the second quantizer 933 may correspond to the first quantizer 911 and the second quantizer 913 of FIG. 9A. Since an LSF coefficient is encoded for each frame, a prediction may be performed using a 10- or 16-dimension LSF coefficient in a frame. According to FIG. 9B, a signal z(n) may be quantized through the first quantizer 931 and the intra-frame predictor 932. As a past signal to be used for an intra-frame prediction, a value t(n) of a previous stage, which has been quantized through a TCQ, is used. A prediction coefficient to be used for the intra-frame prediction may be defined in advance through a codebook training operation. For the TCQ, one dimension is commonly used, and according to circumstances, a higher degree or dimension may be used. Since a TCVQ deals with a vector, the prediction coefficient may have a N-dimension or N×N matrix format corresponding to a size of a dimension N of the vector. Herein, N may be a natural number greater than or equal to 2. For example, when a dimension of a VQ is 2, it is necessary to obtain a prediction coefficient in advance by using a 2 dimension or 2×2-sized matrix. According to an embodiment, the TCVQ uses 2D, and the intra-frame predictor 932 has a size of 2×2.

An intra-frame prediction operation of the TCQ is as follows. An input signal $t_j(n)$ of the first quantizer 931, i.e., a first TCQ, may be obtained by Equation 13 below.

$$t_j(n)=r_j(n)-\rho_j\hat{r}_{j-1}(n),\ j=1,\ \ldots\ ,M-1$$

$$\hat{r}_{j-1}(n)=\hat{t}_{j-1}(n)-\rho_{j-1}\hat{r}_{j-2}(n),\ j=2,\ \ldots\ ,M-2 \quad \text{[Equation 13]}$$

Herein, M denotes a dimension of an LSF coefficient and $\rho_j$ denotes a 1D prediction coefficient.

The first quantizer 931 may quantize a prediction error vector t(n). According to an embodiment, the first quantizer 931 may be implemented using a TCQ, in detail, a BC-TCQ, a BC-TCVQ, a TCQ, or a TCVQ. The intra-frame predictor 932 used together with the first quantizer 931 may repeat a quantization operation and a prediction operation in an element unit or a sub-vector unit of an input vector. An operation of the second quantizer 933 is the same as that of the second quantizer 913 of FIG. 9A.

When the first quantizer 931 is implemented based on an N-dimension TCVQ or an N-dimension BC-TCVQ, the first quantizer 931 may quantize an error vector between a N-dimension sub-vector and a prediction vector. Herein, N may be a natural number greater than or equal to 2. The intra-frame predictor 932 may generate a prediction vector from the quantized N-dimension sub-vector. The intra-frame predictor 932 may use a prediction coefficient with a N×N matrix and may perform intra-frame prediction by using a quantized N-dimension sub-vector of a previous stage. The second quantizer 933 may quantize a quantization error for an N-dimension sub-vector.

In more detail, the intra-frame predictor 932 may generate a prediction vector of a current stage from a quantized N-dimension linear vector of a previous stage and a prediction matrix of a current stage. The first quantizer 931 may generate a quantized error vector by quantizing an error vector which corresponds to a difference between a prediction vector of a current stage and an N-dimension linear vector of the current stage. The linear vector of a previous stage may be generated based on an error vector of the previous stage and a prediction vector of the previous stage. The second quantizer 933 may generate a quantized quantization error vector by quantizing a quantization error vector which corresponds to a difference between a quantized N-dimension linear vector of a current stage and an input N-dimension linear vector.

Figure 9C:
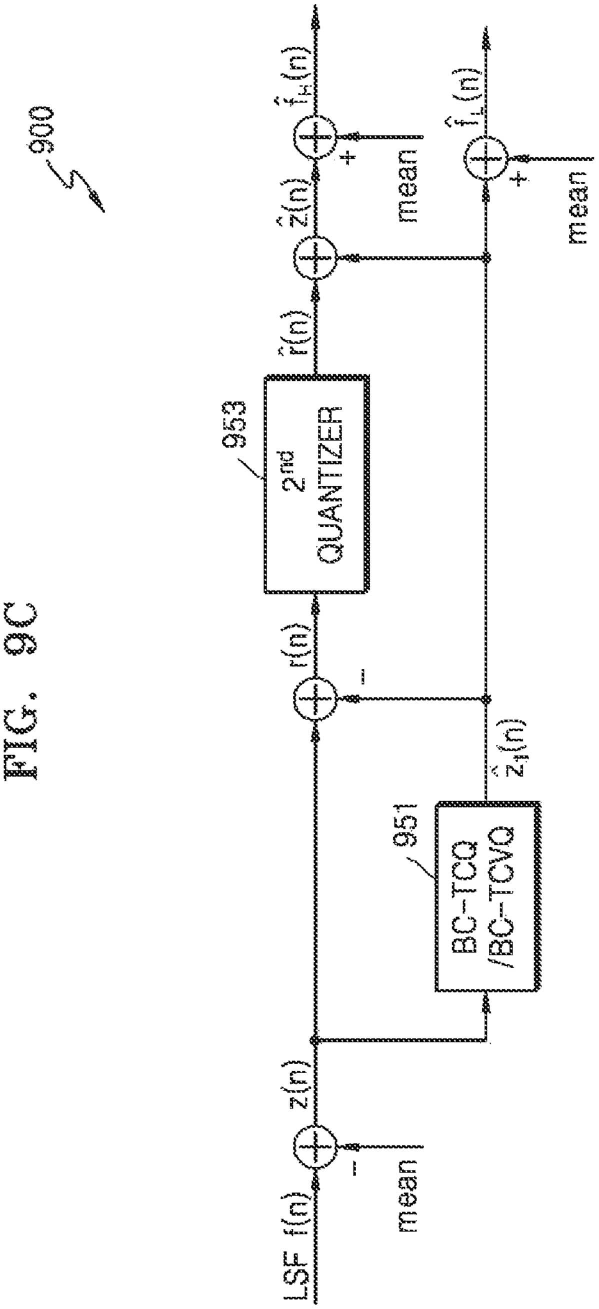

FIG. 9C shows the first quantization module 900 for codebook sharing in addition to the structure of FIG. 9A. The first quantization module 900 may include a first quantizer 951 and a second quantizer 953. When a speech/audio encoder supports multi-rate encoding, a technique of quantizing the same LSF input vector to various bits is necessary. In this case, to exhibit efficient performance while minimizing a codebook memory of a quantizer to be used, it may be implemented to enable two types of bit number allocation with one structure. In FIG. 9C, $f_H(n)$ denotes a high-rate output, and $f_L(n)$ denotes a low-rate output. In FIG. 9C, when only a BC-TCQ/BC-TCVQ is used, quantization for a low rate may be performed only with the number of bits used for the BC-TCQ/BC-TCVQ. If more precise quantization is needed in addition to the quantization described above, an error signal of the first quantizer 951 may be quantized using the additional second quantizer 953.

Figure 9D:
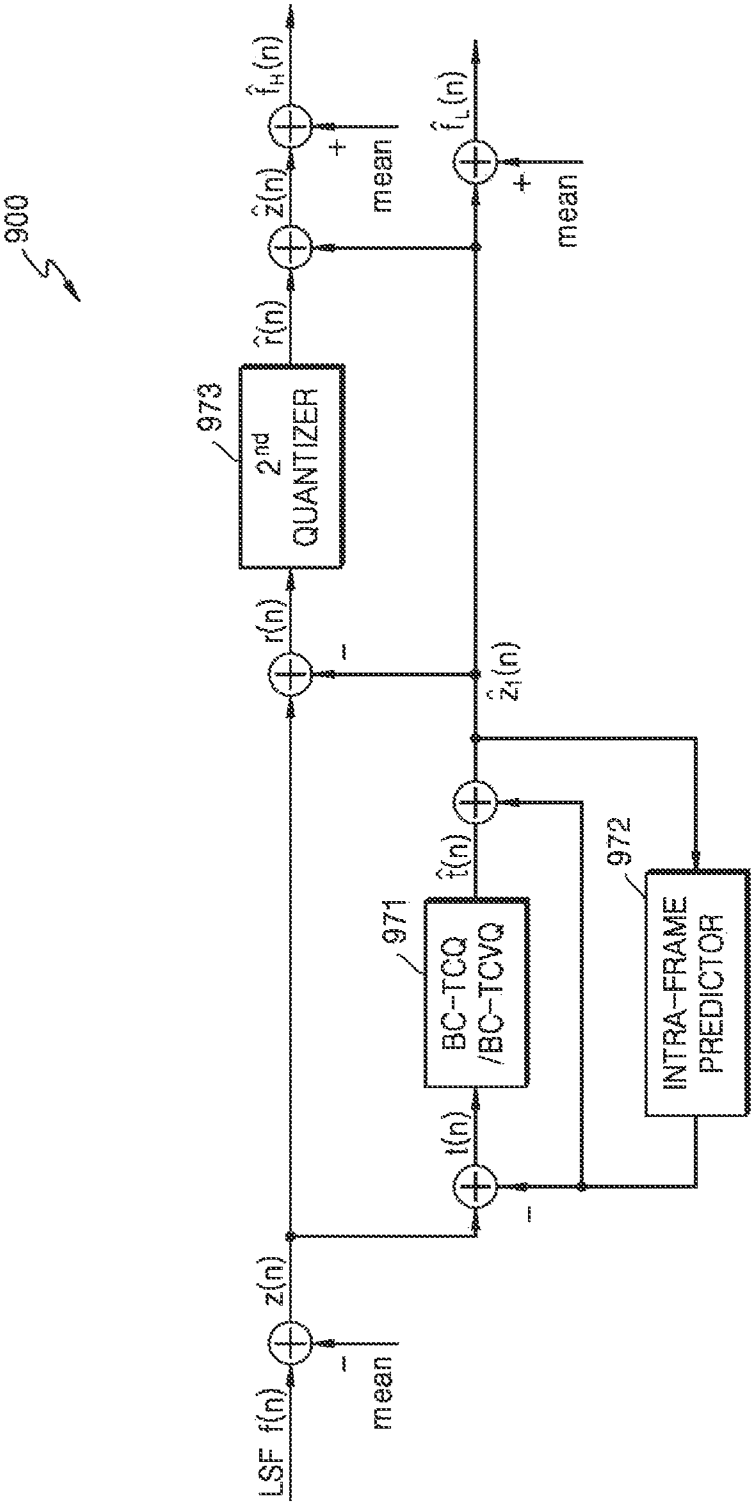

FIG. 9D further includes an intra-frame predictor 972 in addition to the structure of FIG. 9C. The first quantization module 900 may further include the intra-frame predictor 972 in addition to a first quantizer 971 and a second quantizer 973. The first quantizer 971 and the second quantizer 973 may correspond to the first quantizer 951 and the second quantizer 953 of FIG. 9C.

Figure 9E:
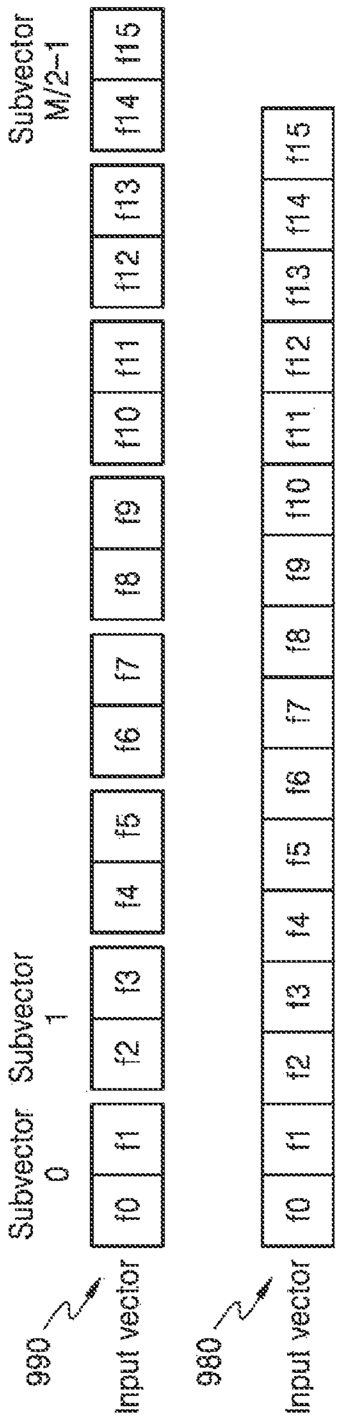

FIG. 9E shows a configuration of an input vector, when the first quantizer 911, 931, 951 or 971 is implemented by a 2-dimension TCVQ in FIGS. 9A through 9D. In general, when input vectors are 16, input vectors 990 of the 2-dimension TCVQ may be 8.

Hereinafter, the intra-frame prediction process will be described in detail, when the first quantizer 931 is implemented by a 2-dimension TCVQ in FIG. 9B.

First, an input signal $t_k(i)$, i.e. a prediction residual vector of the first quantizer 931 may be obtained as represented in Equation 14 below.

$$t_k(0)=z_k(0)$$

$$t_k(i)=z_k(i)-\tilde{z}_k(i),\ \text{for } i=1,\ldots,M/2-1 \quad \text{[Equation 14]}$$

where $\tilde{z}_k(i)=A_i\hat{z}_k(i-1)$, for $i=1, \ldots, M/2-1$

Herein, M denotes a dimension of an LSF coefficient, $\tilde{z}_k(i)$ denotes an i-th error vector, i.e. an estimation of $z_k(i)$, $\hat{z}_k(i-1)$ denotes an (i−1)-th error vector, i.e. a quantized vector of $z_k(i-1)$, and $A_j$ denotes a 2×2 prediction matrix.

$A_j$ may be represented in Equation 15 below.

$$A_t=R_{01}{}^{i}[R_{11}{}^{i}]^{-1},\ \text{for } i=1,\ldots,M/2-1 \quad \text{[Equation 15]}$$

where $R_{01}{}^{i}=|z(i)z^t(i-1)|$, $R_{11}{}^{i}=|z(i-1)z^t(i-1)|$

That is, the first quantizer 931 may quantize the prediction residual vector $t_k(i)$ and the first quantizer 931 and the intra-frame predictor 932 may quantize $z_k(i)$. As a result, a quantized vector $\hat{z}_k(i)$ of an i-th error vector, i.e. $z_k(i)$ may be represented by Equation 16 below.

$$\hat{z}_k(i)=\hat{z}_k(i)+\tilde{z}_k(i),\ \text{for } i=0,\ldots,M/2-1 \quad \text{[Equation 16]}$$

Table 3 below shows an example of intra-frame prediction coefficients for a BC-TCVQ, for example, the first quantizer 931 used in a safety-net scheme.

TABLE 3

| Coefficient No. | Coefficient value (2 × 2) | |
|---|---|---|
| $A_1$ | −0.452324 | 0.808759 |
| | −0.524298 | 0.305544 |
| $A_2$ | 0.009663 | 0.606028 |
| | −0.013208 | 0.421115 |
| $A_3$ | 0.144877 | 0.673495 |
| | 0.080963 | 0.580317 |
| $A_4$ | 0.208825 | 0.633144 |
| | 0.215958 | 0.574520 |
| $A_5$ | 0.050822 | 0.767842 |
| | 0.076879 | 0.416693 |
| $A_6$ | 0.005058 | 0.550614 |
| | −0.006786 | 0.296984 |
| $A_7$ | −0.023860 | 0.611144 |
| | −0.162706 | 0.576228 |

Hereinafter, the intra-frame prediction process will be described in detail, when the first quantizer 1031 is implemented by a 2-dimension TCVQ in FIG. 10B.

In this case, the first quantizer 1031 and the intra-frame predictor 1032 may quantize $r_k(i)$. When the first quantizer 1031 is implemented by a BC-TCVQ, an optimal index for each stage of a BC-TCVQ may be obtained by searching for an index for minimizing $E_{werr}(p)$ of Equation 17.

$$E_{werr}(p)=\sum_{i=0}^{1} w_{end}((2(j-1)+i)\left(t'_k(2(j-1)+i)-c_j^p(i)\right)^2, \quad \text{[Equation 17]}$$

$$\text{for } p=1,\ldots,P_j \text{ and } j=1,\ldots,M/2$$

In Equation 17, $P_j$ denotes the number of codevectors in a j-th sub-codebook, $c_j^p$ denotes a p-th codevector in a j-th sub-codebook, $w_{end}(i)$ denotes a weighting function, and $t_k'=[t_k'(0), t_k'(1), \ldots, t_k'(M/2-1)]$ may also be concluded.

The intra-frame predictor 1032 may use the same intra-frame prediction procedure with different prediction coefficients as that of the safety-net scheme.

That is, the first quantizer 1031 may quantize the prediction residual vector $t_k(i)$ and the first quantizer 1031 and the intra-frame predictor 1032 may quantize $r_k(i)$. As a result, a quantized vector $\hat{r}_k(i)$ of $r_k(i)$ may be represented by Equation 18 below.

$$\hat{r}_k(i)=\hat{t}_k(i)+\tilde{r}_k(i),\ \text{for } i=0,\ldots,M/2-1 \quad \text{[Equation 18]}$$

Table 4 below shows an example of intra-frame prediction coefficients for a BC-TCVQ, for example, the first quantizer 1031 used in a predictive scheme.

TABLE 4

| Coefficient No. | Coefficient value (2 × 2) | |
|---|---|---|
| $A_1$ | −0.292479 | 0.676331 |
| | −0.422648 | 0.217490 |
| $A_2$ | 0.048957 | 0.500576 |
| | 0.087301 | 0.287286 |

TABLE 4-continued

| Coefficient No. | Coefficient value (2 × 2) | |
|---|---|---|
| $A_3$ | 0.199481 | 0.502784 |
| | 0.106762 | 0.420907 |
| $A_4$ | 0.240459 | 0.440504 |
| | 0.214255 | 0.396496 |
| $A_5$ | 0.193161 | 0.494850 |
| | 0.158690 | 0.306771 |
| $A_6$ | 0.093435 | 0.370662 |
| | 0.065526 | 0.148231 |
| $A_7$ | 0.037417 | 0.336906 |
| | −0.024246 | 0.187298 |

The above intra-frame prediction procedure of each embodiment may be applied similarly, even in a case that the first quantizer 931 is implemented by a 2-dimension TCVQ, and may be applied irrespective of whether the second quantizer 933 exists or not. According to embodiment, the intra-frame prediction procedure may use an AR method, but not limited thereto.

The first quantization module 900 shown in FIGS. 9A and 9B may be implemented without the second quantizer 913 or 933. In this case, an quantization index for a quantization error of one-dimension or N-dimension sub-vector may not be included in a bitstream.

FIGS. 10A through 10F are block diagrams illustrating various implemented examples of the second quantization module shown in FIG. 6.

Figure 10A:
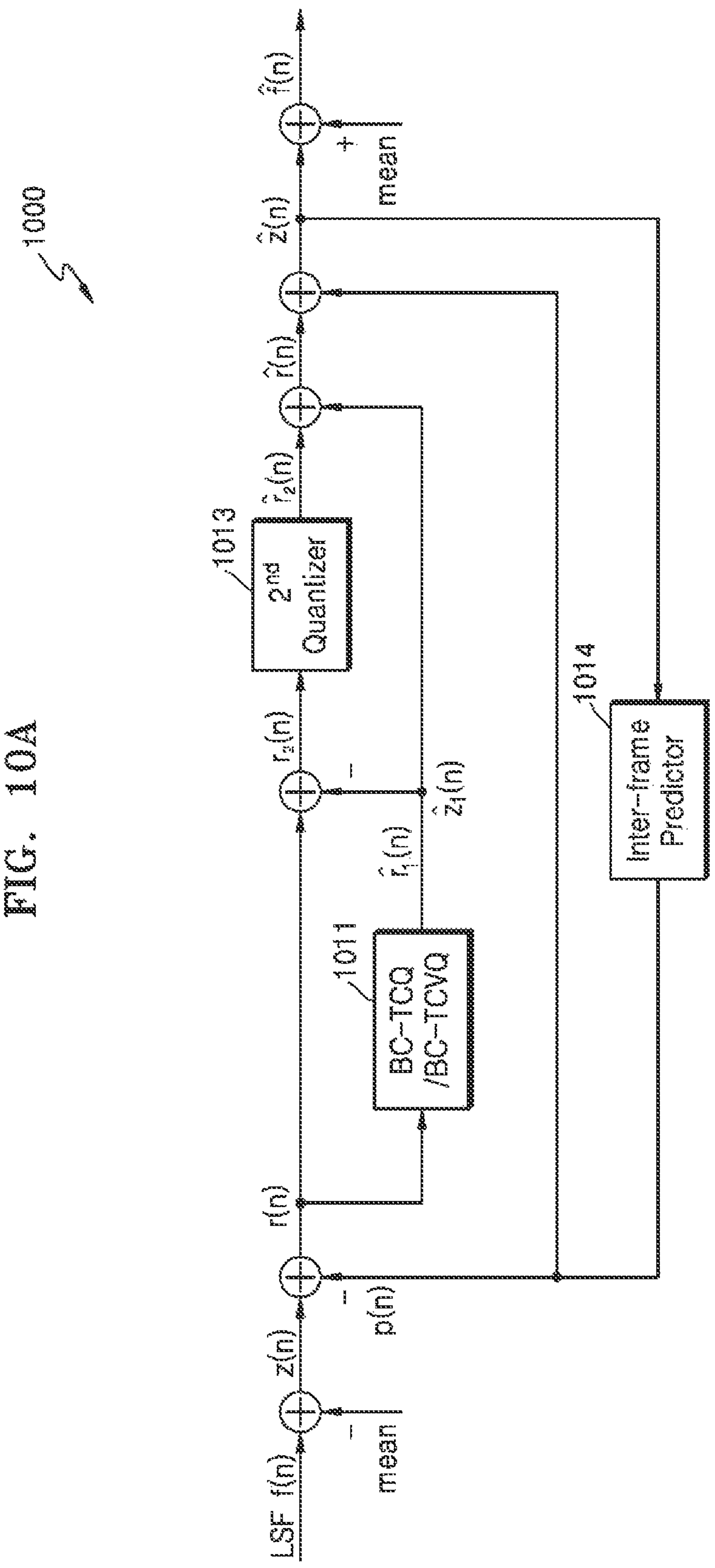
FIGS. 10A through 10D are block diagrams illustrating various implemented examples of a second quantization module shown in FIG. 6.

A second quantization module 10000 shown in FIG. 10A further includes an inter-frame predictor 1014 in addition to the structure of FIG. 9B. The second quantization module 10000 shown in FIG. 10A may further include the inter-frame predictor 1014 in addition to a first quantizer 1011 and a second quantizer 1013. The inter-frame predictor 1014 is a technique of predicting a current frame by using an LSF coefficient quantized with respect to a previous frame. An inter-frame prediction operation uses a method of performing subtraction from a current frame by using a quantized value of a previous frame and then performing addition of a contribution portion after quantization. In this case, a prediction coefficient is obtained for each element.

Figure 10B:
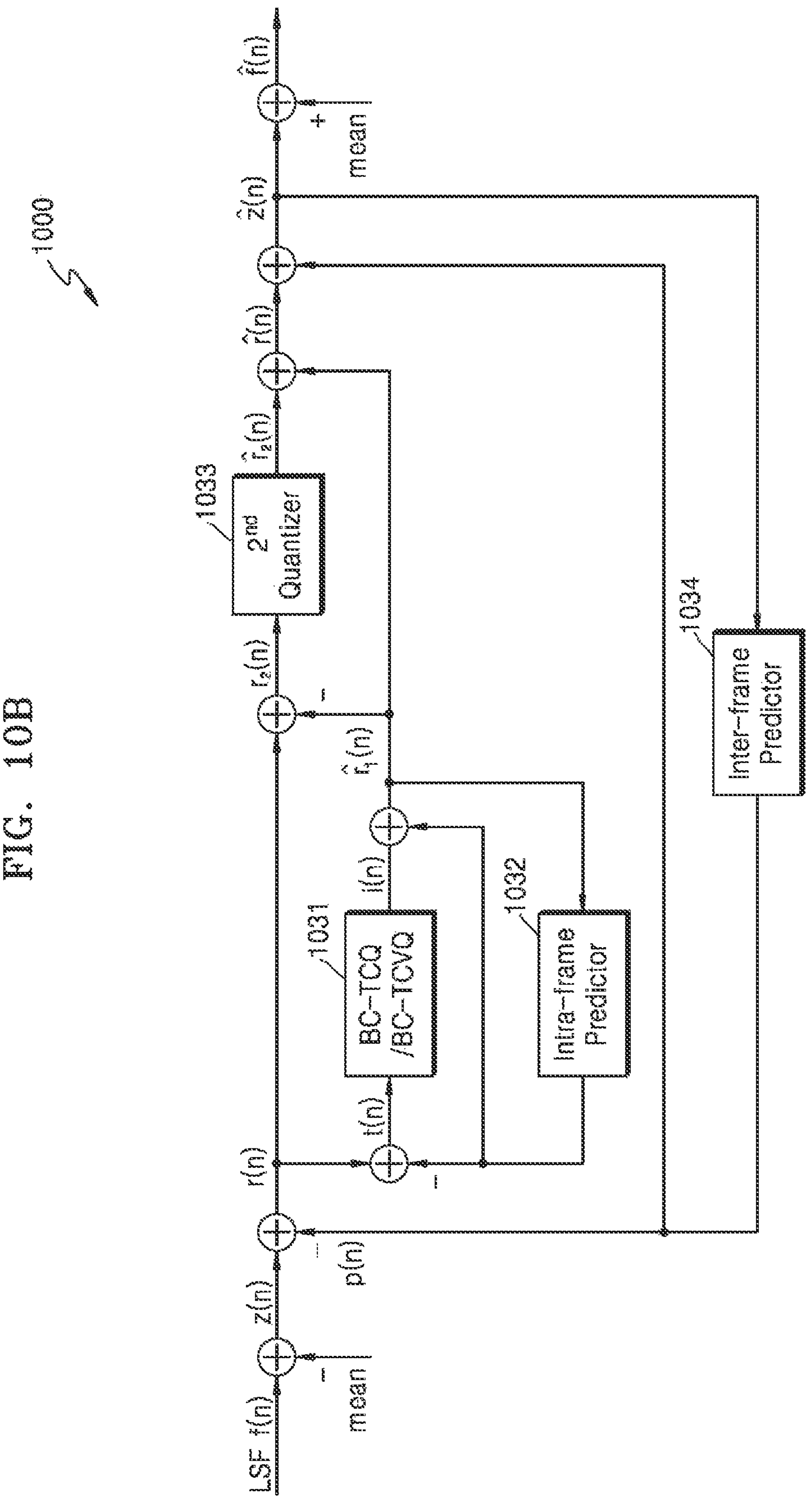

The second quantization module 10000 shown in FIG. 10B further includes an intra-frame predictor 1032 in addition to the structure of FIG. 10A. The second quantization module 10000 shown in FIG. 10B may further include the intra-frame predictor 1032 in addition to a first quantizer 1031, a second quantizer 1033, and an inter-frame predictor 1034. When the first quantizer 1031 is implemented based on an N-dimension TCVQ or an N-dimension BC-TCVQ, the first quantizer 1031 may quantize an error vector which corresponds to a difference between a prediction error vector between a N-dimension sub-vector and a prediction vector of a current frame, and a prediction vector. Herein, N may be a natural number greater than or equal to 2. The intra-frame predictor 1032 may generate a prediction vector from the quantized prediction error vector. The inter-frame predictor 1034 may use a prediction vector of the current frame from a quantized N-dimension sub-vector of a previous frame. The second quantizer 1033 may quantize a quantization error for the prediction error vector.

In more detail, the first quantizer 1031 may quantize an error vector which corresponds to a difference between a prediction error vector and a prediction vector of a current stage. The prediction error vector may corresponds to a difference between a prediction vector of a current frame and an N-dimension linear vector of a current stage. The intra-frame predictor 1032 may generate a prediction vector of a current stage from a quantized prediction error vector of a previous stage and a prediction matrix of a current stage. The second quantizer 1033 may generate a quantized quantization error vector by quantizing a quantization error vector which corresponds to a difference between a quantized prediction error vector of a current stage and a prediction error vector which corresponds to a difference between a prediction vector of a current frame and an N-dimension linear vector of a current stage.

Figure 10C:
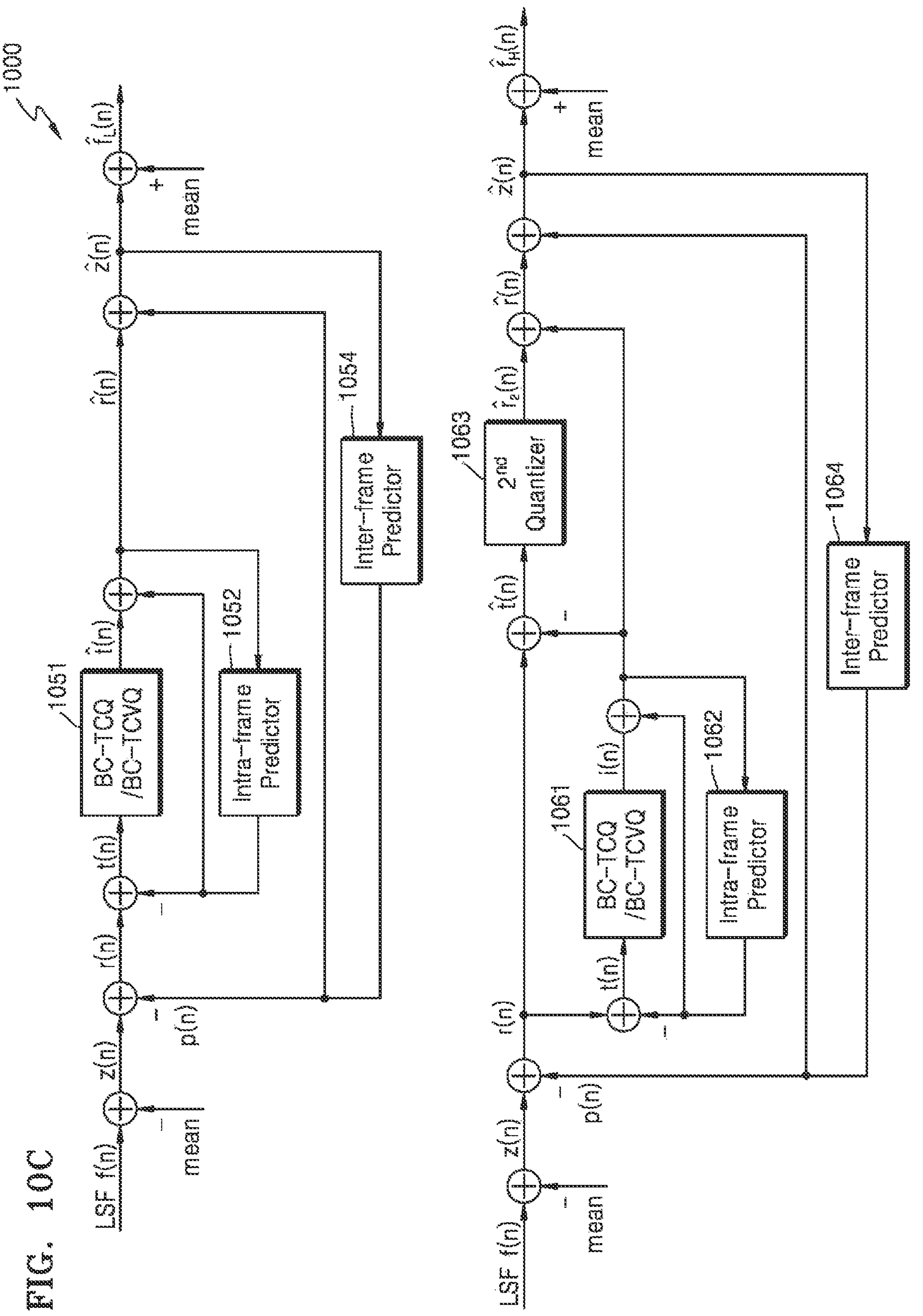

FIG. 10C shows the second quantization module 1000 for codebook sharing in addition to the structure of FIG. 10B. That is, a structure of sharing a codebook of a BC-TCQ/BC-TCVQ between a low rate and a high rate is shown in addition to the structure of FIG. 10B. In FIG. 10B, an upper circuit diagram indicates an output related to a low rate for which a second quantizer (not shown) is not used, and a lower circuit diagram indicates an output related to a high rate for which a second quantizer 1063 is used.

Figure 10D:
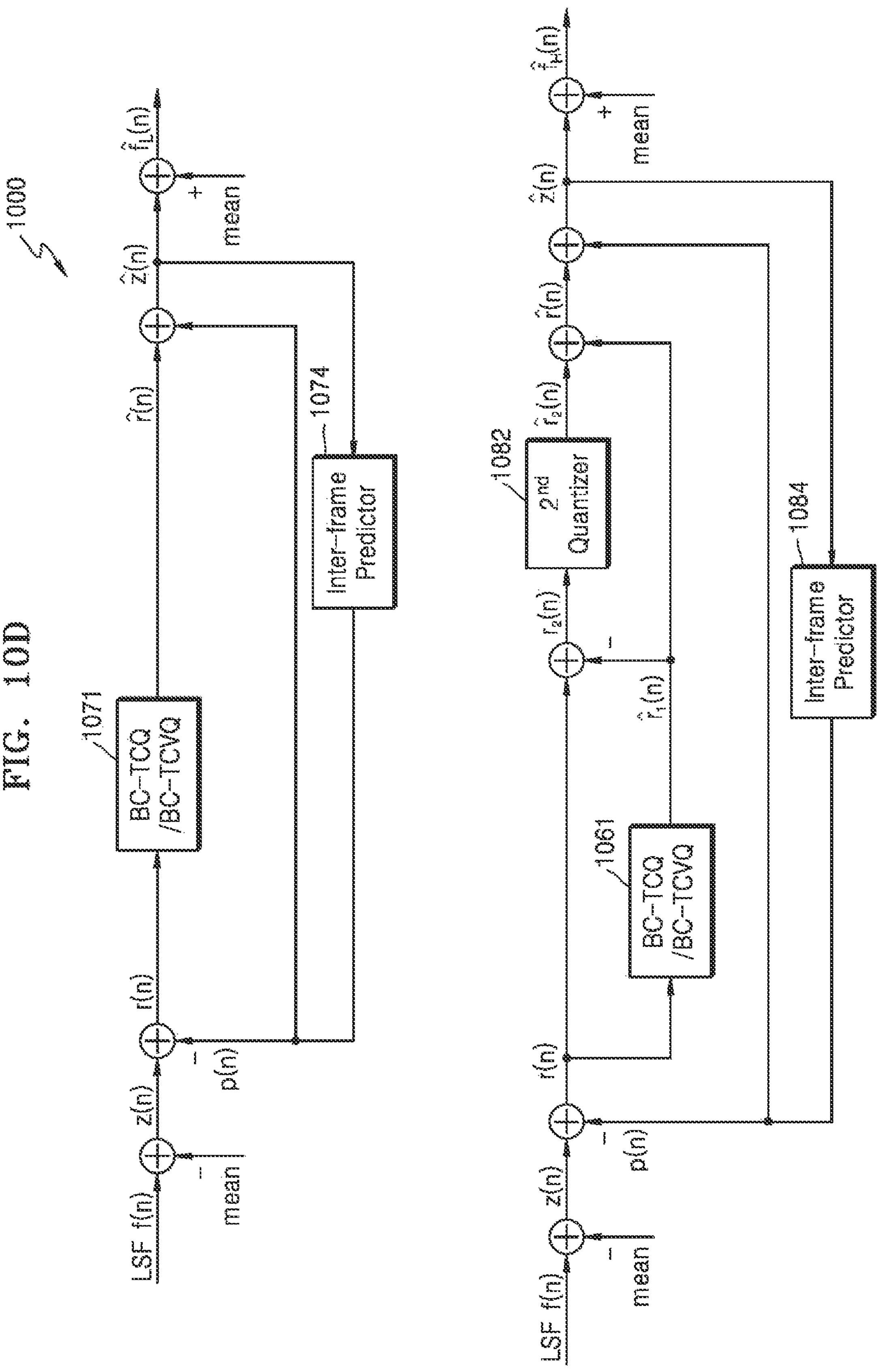

FIG. 10D shows an example in which the second quantization module 1000 is implemented by omitting an intra-frame predictor from the structure of FIG. 10C.

The above intra-frame prediction procedure of each embodiment may be applied similarly, even in a case that the quantizer is implemented by a 2-dimension TCVQ, and may be applied irrespective of whether the second quantizer 1033 exists. According to embodiment, the intra-frame prediction procedure may use an AR method, but not limited thereto.

The first quantization module 1000 shown in FIGS. 10A and 10B may be implemented without the second quantizer 1013 or 1033. In this case, an quantization index for a quantization error of one-dimension or N-dimension sub-vector may not be included in a bitstream.

FIGS. 11A through 11F are block diagrams illustrating various implemented examples of a quantizer 1100 in which a weight is applied to a BC-TCVQ.

Figure 11A:
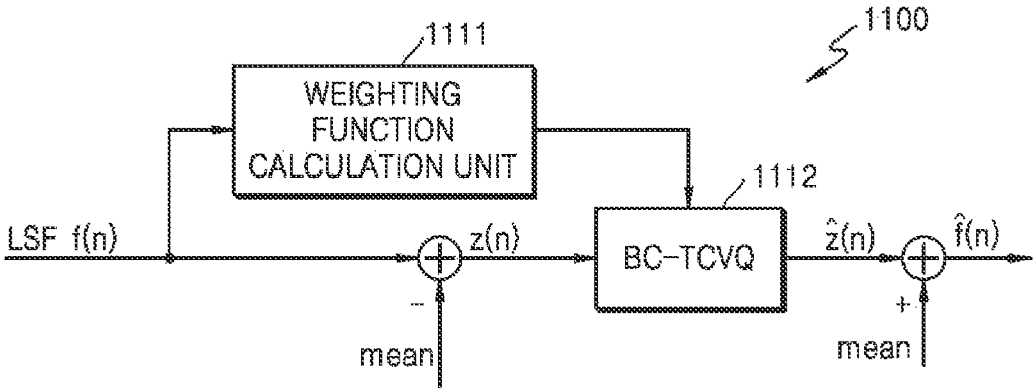
FIGS. 11A through 11F are block diagrams illustrating various implemented examples of a quantizer in which a weight is applied to a block-constrained trellis coded vector quantizer (BC-TCVQ).
Figure 11B:
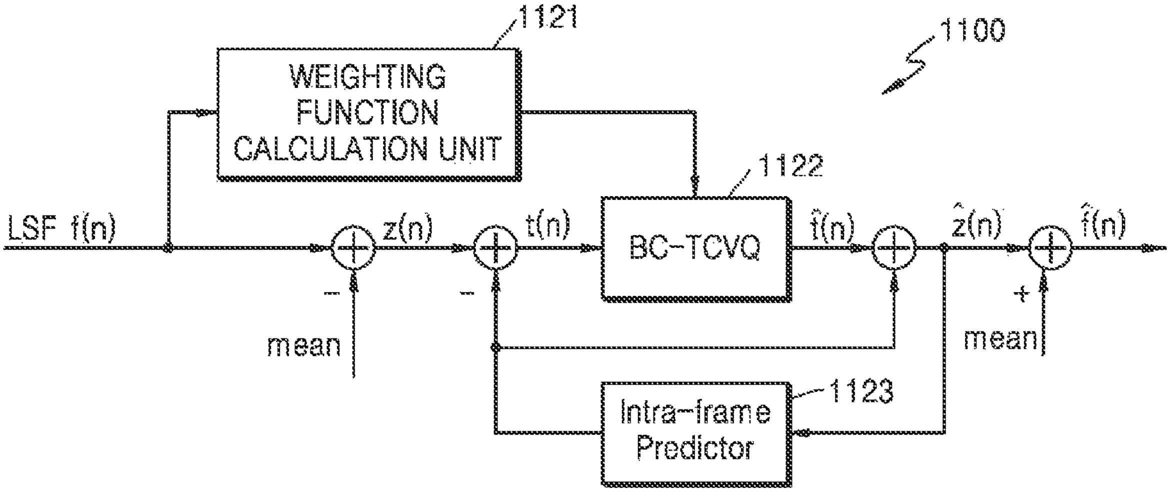

FIG. 11A shows a basic BC-TCVQ and may include a weighting function calculation unit 1111 and a BC-TCVQ part 1112. When the BC-TCVQ obtains an optimal index, an index by which weighted distortion is minimized is obtained. FIG. 11B shows a structure of adding an intra-frame predictor 1123 to FIG. 11A. For intra-frame prediction used in FIG. 11B, the AR method or the MA method may be used. According to an embodiment, the AR method is used, and a prediction coefficient to be used may be defined in advance.

Figure 11C:
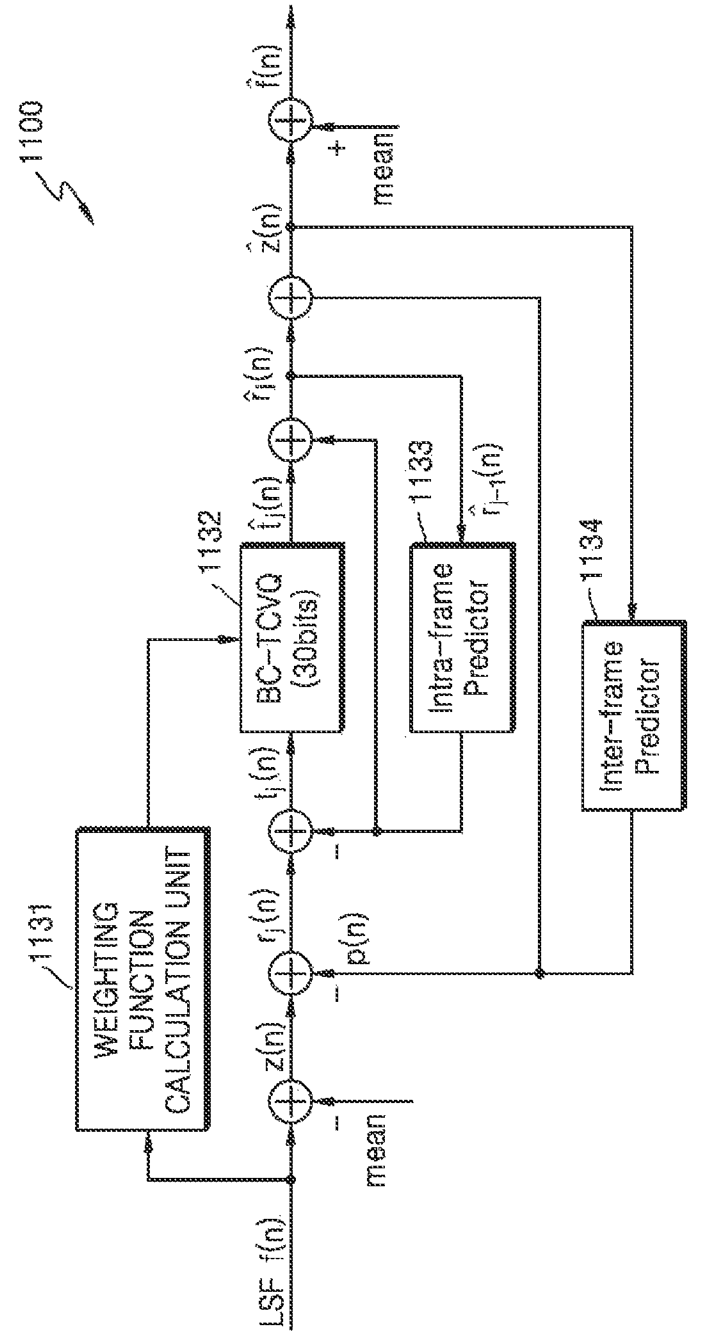

FIG. 11C shows a structure of adding an inter-frame predictor 1134 to FIG. 11B for additional performance improvement. FIG. 11C shows an example of a quantizer used in the predictive scheme. For inter-frame prediction used in FIG. 11C, the AR method or the MA method may be used. According to an embodiment, the AR method is used, and a prediction coefficient to be used may be defined in advance. A quantization operation is described as follows. First, a prediction error value predicted using the inter-frame prediction may be quantized by means of a BC-TCVQ using the inter-frame prediction. A quantization index value is transmitted to a decoder. A decoding operation is described as follows. A quantized value r(n) is obtained by adding an intra-frame prediction value to a quantized result of the BC-TCVQ. A finally quantized LSF value is obtained by adding a prediction value of the inter-frame predictor 1134 to the quantized value r(n) and then adding a mean value to the addition result.

Figure 11D:
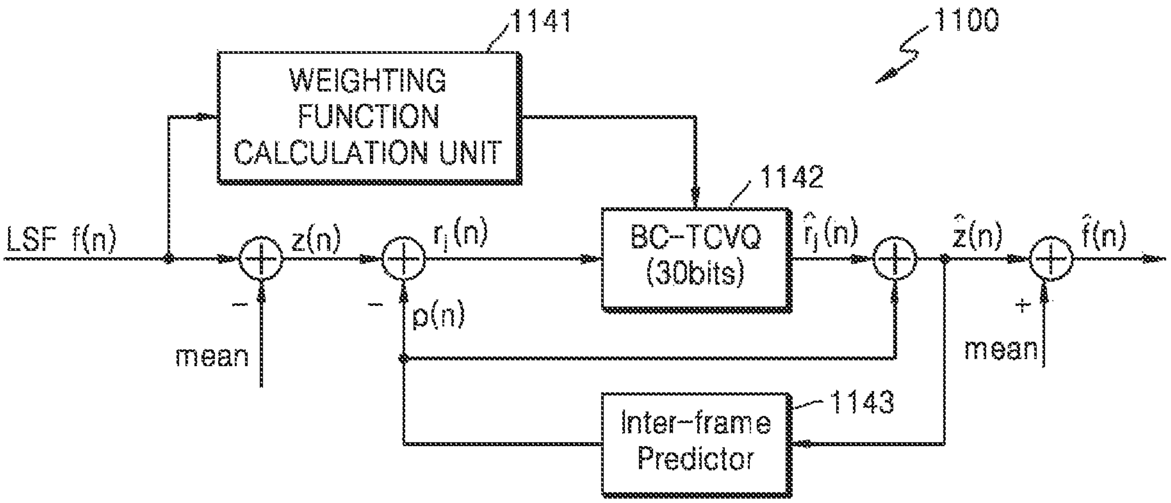
Figure 11E:
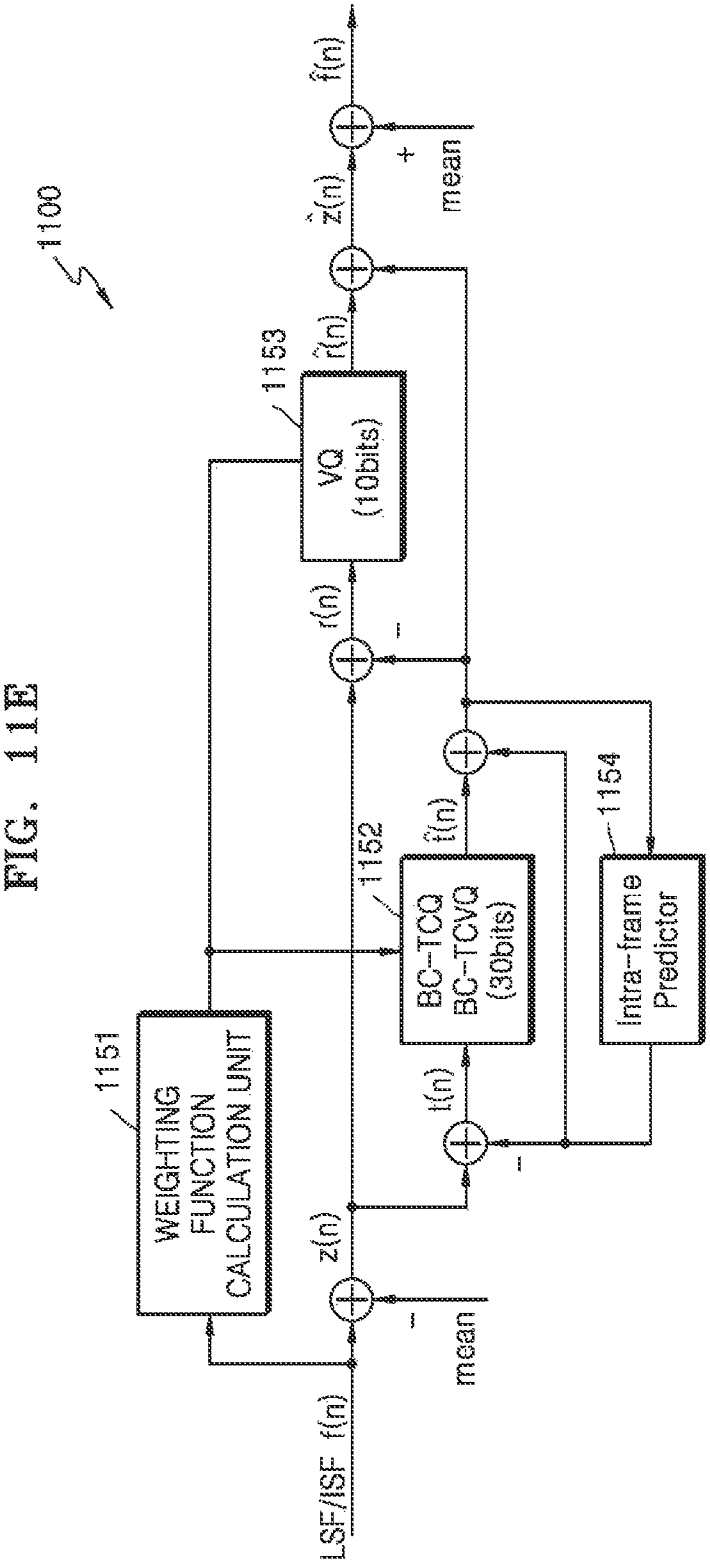
Figure 11F:
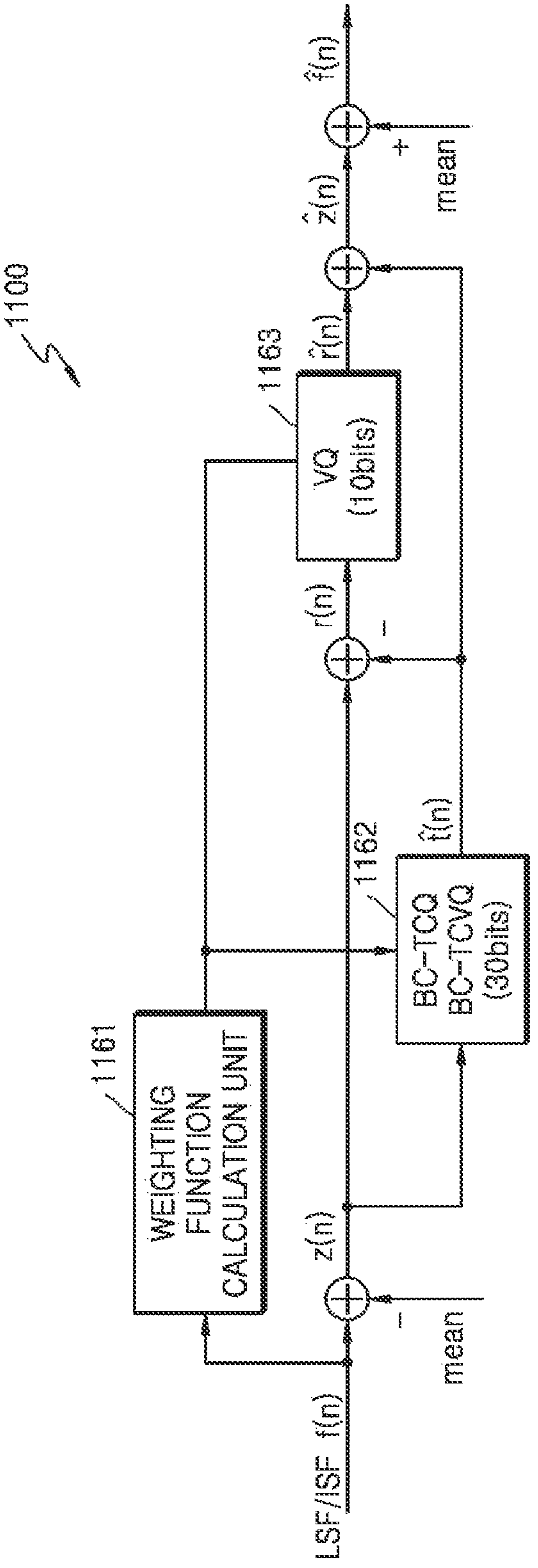

FIG. 11D shows a structure in which an intra-frame predictor is omitted from FIG. 11C. FIG. 11E shows a structure of how a weight is applied when a second quantizer 1153 is added. A weighting function obtained by a weighting function calculation unit 1151 is used for both a first quantizer 1152 and the second quantizer 1153, and an optimal index is obtained using weighted distortion. The first quantizer 1152 may be implemented using a BC-TCQ, a BC-TCVQ, a TCQ, or a TCVQ. The second quantizer 1153 may be implemented using an SQ, a VQ, an SVQ, or an MSVQ. FIG. 11F shows a structure in which an inter-frame predictor is omitted from FIG. 11E.

A quantizer of a switching structure mat be implemented by combining the quantizer forms of various structures, which have been described with reference to FIGS. 11A through 11F.

Figure 12:
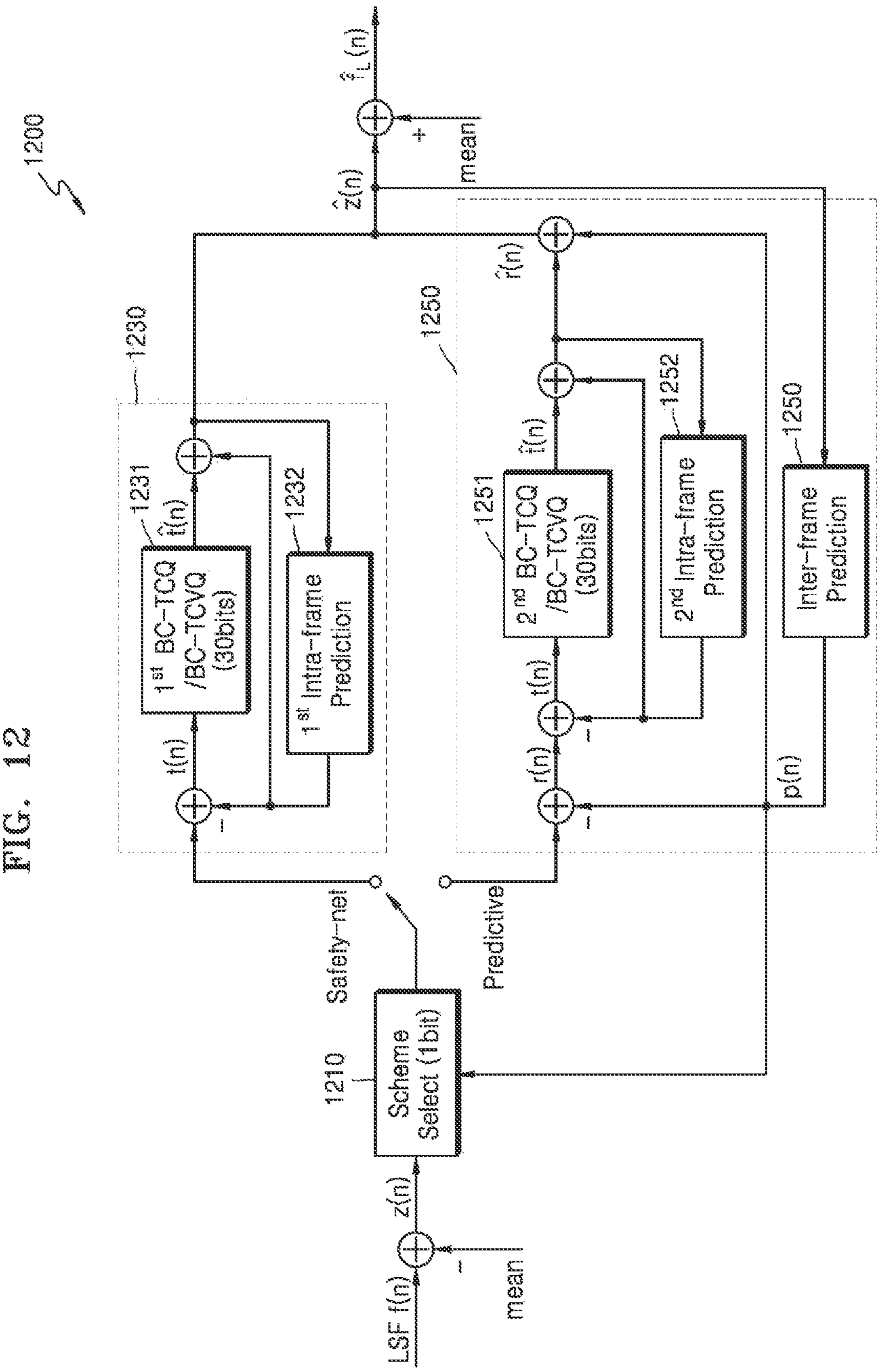
FIG. 12 is a block diagram of a quantization apparatus having a switching structure of an open-loop scheme at a low rate, according to an exemplary embodiment.

FIG. 12 is a block diagram of a quantization device having a switching structure of an open-loop scheme at a low rate, according to an exemplary embodiment. A quantization device 1200 shown in FIG. 12 may include a selection unit 1210, a first quantization module 1230, and a second quantization module 1250.

The selection unit 1210 may select one of the safety-net scheme and the predictive scheme as a quantization scheme based on a prediction error.

The first quantization module 1230 performs quantization without an inter-frame prediction when the safety-net scheme is selected and may include a first quantizer 1231 and a first intra-frame predictor 1232. In detail, an LSF vector may be quantized to 30 bits by the first quantizer 1231 and the first intra-frame predictor 1232.

The second quantization module 1250 performs quantization with an inter-frame prediction when the predictive scheme is selected and may include a second quantizer 1251, a second intra-frame predictor 1252, and an inter-frame predictor 1253. In detail, a prediction error corresponding to a difference between an LSF vector from which a mean value has been removed and a prediction vector may be quantized to 30 bits by the second quantizer 1251 and the second intra-frame predictor 1252.

The quantization apparatus shown in FIG. 12 illustrates an example of LSF coefficient quantization using 31 bits in the VC mode. The first and second quantizers 1231 and 1251 in the quantization device of FIG. 12 may share codebooks with first and second quantizers 1331 and 1351 in a quantization device of FIG. 13. An operation of the quantization apparatus shown in FIG. 12 is described as follows. A signal z(n) may be obtained by removing a mean value from an input LSF value f(n). The selection unit 1210 may select or determine an optimal quantization scheme by using values p(n) and z(n) inter-frame-predicted using a decoded value z(n) in a previous frame, a weighting function, and a prediction mode pred_mode. According to the selected or determined result, quantization may be performed using one of the safety-net scheme and the predictive scheme. The selected or determined quantization scheme may be encoded by means of one bit.

When the safety-net scheme is selected by the selection unit 1210, an entire input vector of an LSF coefficient z(n) from which the mean value has been removed may be quantized through the first intra-frame predictor 1232 and using the first quantizer 1231 using 30 bits. However, when the predictive scheme is selected by the selection unit 1210, a prediction error signal obtained using the inter-frame predictor 1253 from the LSF coefficient z(n) from which the mean value has been removed may be quantized through the second intra-frame predictor 1252 and using the second quantizer 1251 using 30 bits. The first and second quantizers 1231 and 1251 may be, for example, quantizers having a form of a TCQ or a TCVQ. In detail, a BC-TCQ, a BC-TCVQ, or the like may be used. In this case, a quantizer uses a total of 31 bits. A quantized result is used as an output of a quantizer of a low rate, and main outputs of the quantizer are a quantized LSF vector and a quantization index.

Figure 13:
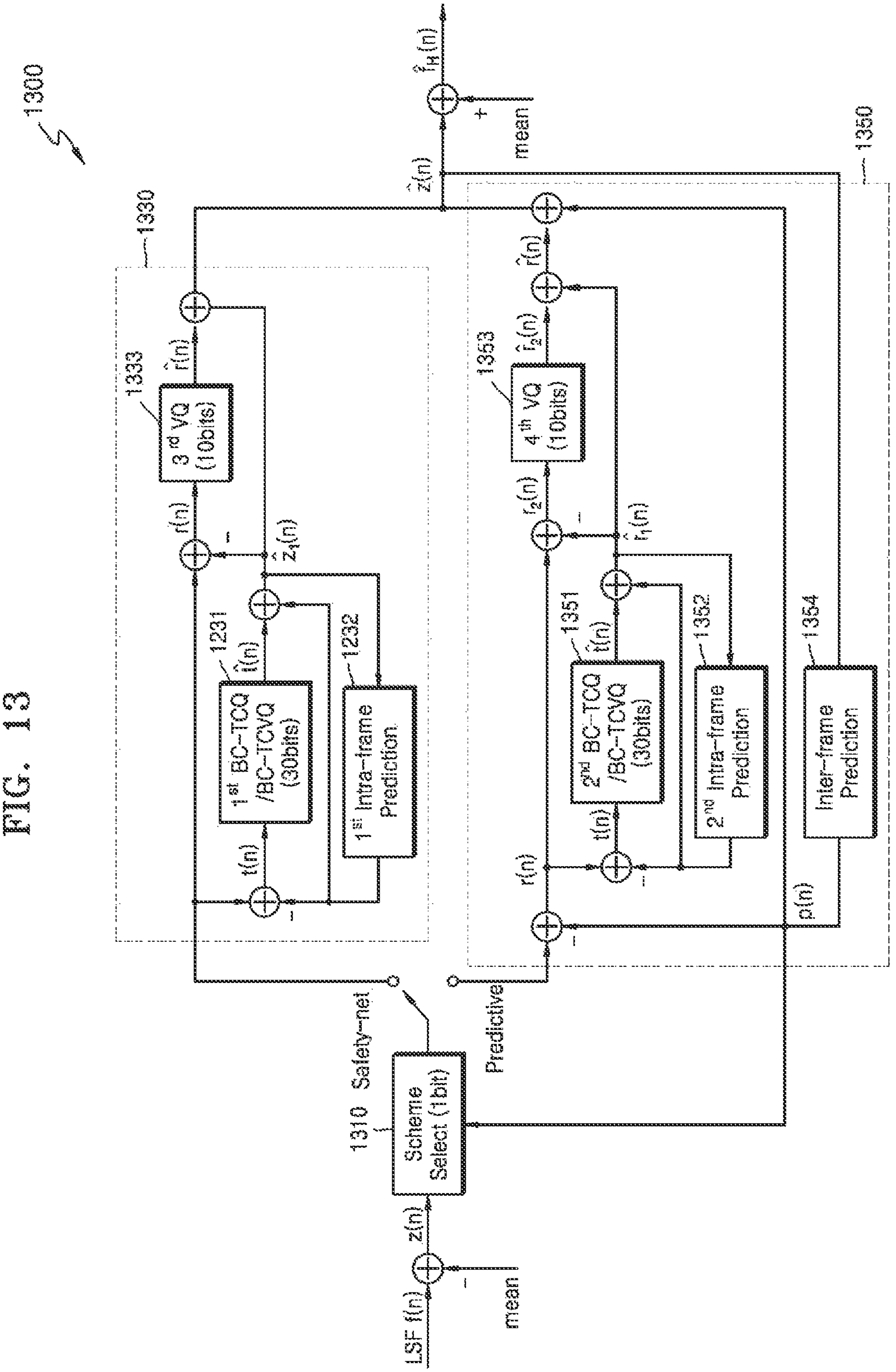
FIG. 13 is a block diagram of a quantization apparatus having a switching structure of an open-loop scheme at a high rate, according to an exemplary embodiment.

FIG. 13 is a block diagram of a quantization apparatus having a switching structure of an open-loop scheme at a high rate, according to an exemplary embodiment. A quantization device 1300 shown in FIG. 13 may include a selection unit 1310, a first quantization module 1330, and a second quantization module 1350. When compared with FIG. 12, there are differences in that a third quantizer 1333 is added to the first quantization module 1330, and a fourth quantizer 1353 is added to the second quantization module 1350. In FIGS. 12 and 13, the first quantizers 1231 and 1331 and the second quantizers 1251 and 1351 may use the same codebooks, respectively. That is, the 31-bit LSF quantization apparatus 1200 of FIG. 12 and the 41-bit LSF quantization apparatus 1300 of FIG. 13 may use the same codebook for a BC-TCVQ. Accordingly, although the codebook cannot be said as an optimal codebook, a memory size may be significantly saved.

The selection unit 1310 may select one of the safety-net scheme and the predictive scheme as a quantization scheme based on a prediction error.

The first quantization module 1330 may perform quantization without an inter-frame prediction when the safety-net scheme is selected and may include the first quantizer 1331, the first intra-frame predictor 1332, and the third quantizer 1333.

The second quantization module 1350 may perform quantization with an inter-frame prediction when the predictive scheme is selected and may include the second quantizer 1351, a second intra-frame predictor 1352, the fourth quantizer 1353, and an inter-frame predictor 1354.

The quantization apparatus shown in FIG. 13 illustrates an example of LSF coefficient quantization using 41 bits in the VC mode. The first and second quantizers 1331 and 1351 in the quantization device 1300 of FIG. 13 may share codebooks with the first and second quantizers 1231 and 1251 in the quantization device 1200 of FIG. 12, respectively. An operation of the quantization apparatus 1300 is described as follows. A signal z(n) may be obtained by removing a mean value from an input LSF value f(n). The selection unit 1310 may select or determine an optimal quantization scheme by using values p(n) and z(n) inter-frame-predicted using a decoded value z(n) in a previous frame, a weighting function, and a prediction mode pred_mode. According to the selected or determined result, quantization may be performed using one of the safety-net scheme and the predictive scheme. The selected or determined quantization scheme may be encoded by means of one bit.

When the safety-net scheme is selected by the selection unit 1310, an entire input vector of an LSF coefficient z(n) from which the mean value has been removed may be quantized and inverse-quantized through the first intra-frame predictor 1332 and the first quantizer 1331 using 30 bits. A second error vector indicating a difference between an original signal and the inverse-quantized result may be provided as an input of the third quantizer 1333. The third quantizer 1333 may quantize the second error vector by using 10 bits. The third quantizer 1333 may be, for example, an SQ, a VQ, an SVQ, or an MSVQ. After the quantization and the inverse quantization, a finally quantized vector may be stored for a subsequent frame.

However, when the predictive scheme is selected by the selection unit 1310, a prediction error signal obtained by subtracting p(n) of the inter-frame predictor 1354 from the LSF coefficient z(n) from which the mean value has been removed may be quantized or inverse-quantized by the second quantizer 1351 using 30 bits and the second intra-frame predictor 1352. The first and second quantizers 1331 and 1351 may be, for example, quantizers having a form of a TCQ or a TCVQ. In detail, a BC-TCQ, a BC-TCVQ, or the like may be used. A second error vector indicating a difference between an original signal and the inverse-quantized result may be provided as an input of the fourth quantizer 1353. The fourth quantizer 1353 may quantize the second error vector by using 10 bits. Herein, the second error vector may be divided into two 8×8-dimension sub-vectors and then quantized by the fourth quantizer 1353. Since a low band is more important that a high band in terms of perception, the second error vector may be encoded by allocating a different number of bits to a first VQ and a second VQ. The fourth quantizer 1353 may be, for example, an SQ, a VQ, an SVQ, or an MSVQ. After the quantization and the inverse quantization, a finally quantized vector may be stored for a subsequent frame.

In this case, a quantizer uses a total of 41 bits. A quantized result is used as an output of a quantizer of a high rate, and main outputs of the quantizer are a quantized LSF vector and a quantization index.

As a result, when both FIG. 12 and FIG. 13 are used, the first quantizer 1231 of FIG. 12 and the first quantizer 1331 of FIG. 13 may share a quantization codebook, and the second quantizer 1251 of FIG. 12 and the second quantizer 1351 of FIG. 13 may share a quantization codebook, thereby significantly saving an entire codebook memory. To additionally save the codebook memory, the third quantizer 1333 and the fourth quantizer 1353 may also share a quantization codebook. In this case, since an input distribution of the third quantizer 1333 differs from that of the fourth quantizer 1353, a scaling factor may be used to compensate for a difference between input distributions. The scaling factor may be calculated by taking into account an input of the third quantizer 1333 and an input distribution of the fourth quantizer 1353. According to an embodiment, an input signal of the third quantizer 1333 may be divided by the scaling factor, and a signal obtained by the division result may be quantized by the third quantizer 1333. The signal quantized by the third quantizer 1333 may be obtained by multiplying an output of the third quantizer 1333 by the scaling factor. As described above, if an input of the third quantizer 1333 or the fourth quantizer 1353 is properly scaled and then quantized, a codebook may be shared while maintaining the performance at most.

Figure 14:
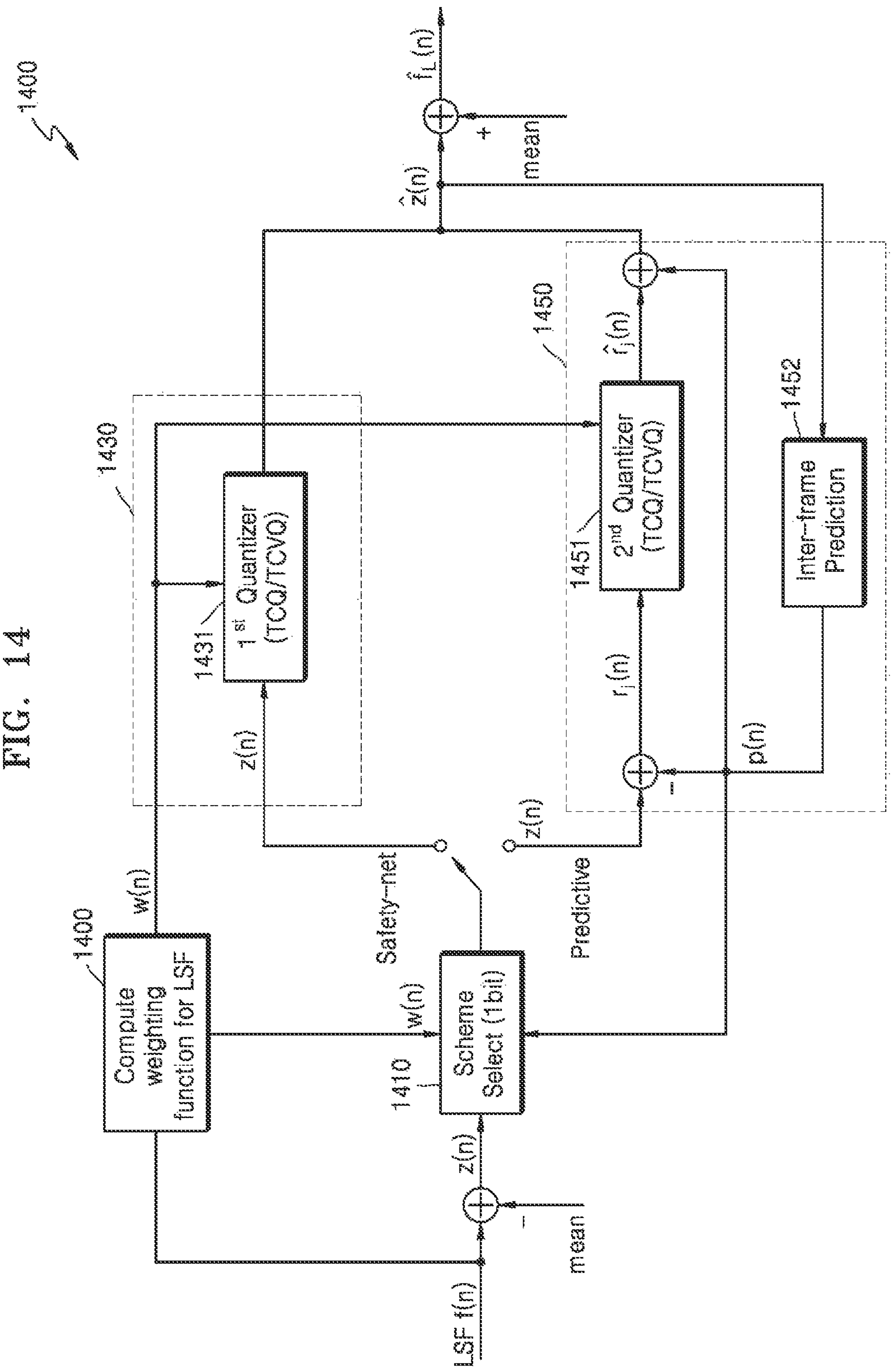
FIG. 14 is a block diagram of a quantization apparatus having a switching structure of an open-loop scheme at a low rate, according to another exemplary embodiment.

FIG. 14 is a block diagram of a quantization apparatus having a switching structure of an open-loop scheme at a low rate, according to another exemplary embodiment. In a quantization device 1400 of FIG. 14, low rate parts of FIGS. 9C and 9D may be applied to a first quantizer 1431 and a second quantizer 1451 used by a first quantization module 1430 and a second quantization module 1450. An operation of the quantization device 1400 is described as follows. A weighting function calculation 1400 may obtain a weighting function w(n) by using an input LSF value. The obtained weighting function w(n) may be used by the first quantizer 1431 and the second quantizer 1451. A signal z(n) may be obtained by removing a mean value from an LSF value f(n). A selection unit 1410 may determine an optimal quantization scheme by using values p(n) and z(n) inter-frame-predicted using a decoded value z(n) in a previous frame, a weighting function, and a prediction mode pred_mode. According to the selected or determined result, quantization may be performed using one of the safety-net scheme and the predictive scheme. The selected or determined quantization scheme may be encoded by means of one bit.

When the safety-net scheme is selected by the selection unit 1410, an LSF coefficient z(n) from which the mean value has been removed may be quantized by the first quantizer 1431. The first quantizer 1431 may use an intra-frame prediction for high performance or may not use the intra-frame prediction for low complexity as described with reference to FIGS. 9C and 9D. When an intra-frame predictor is used, an entire input vector may be provided to the first quantizer 1431 for quantizing the entire input vector by using a TCQ or a TCVQ through the intra-frame prediction.

When the predictive scheme is selected by the selection unit 1410, the LSF coefficient z(n) from which the mean value has been removed may be provided to the second quantizer 1451 for quantizing a prediction error signal, which is obtained using inter-frame prediction, by using a TCQ or a TCVQ through the intra-frame prediction. The first and second quantizers 1431 and 1451 may be, for example, quantizers having a form of a TCQ or a TCVQ. In detail, a BC-TCQ, a BC-TCVQ, or the like may be used. A quantized result is used as an output of a quantizer of a low rate.

Figure 15:
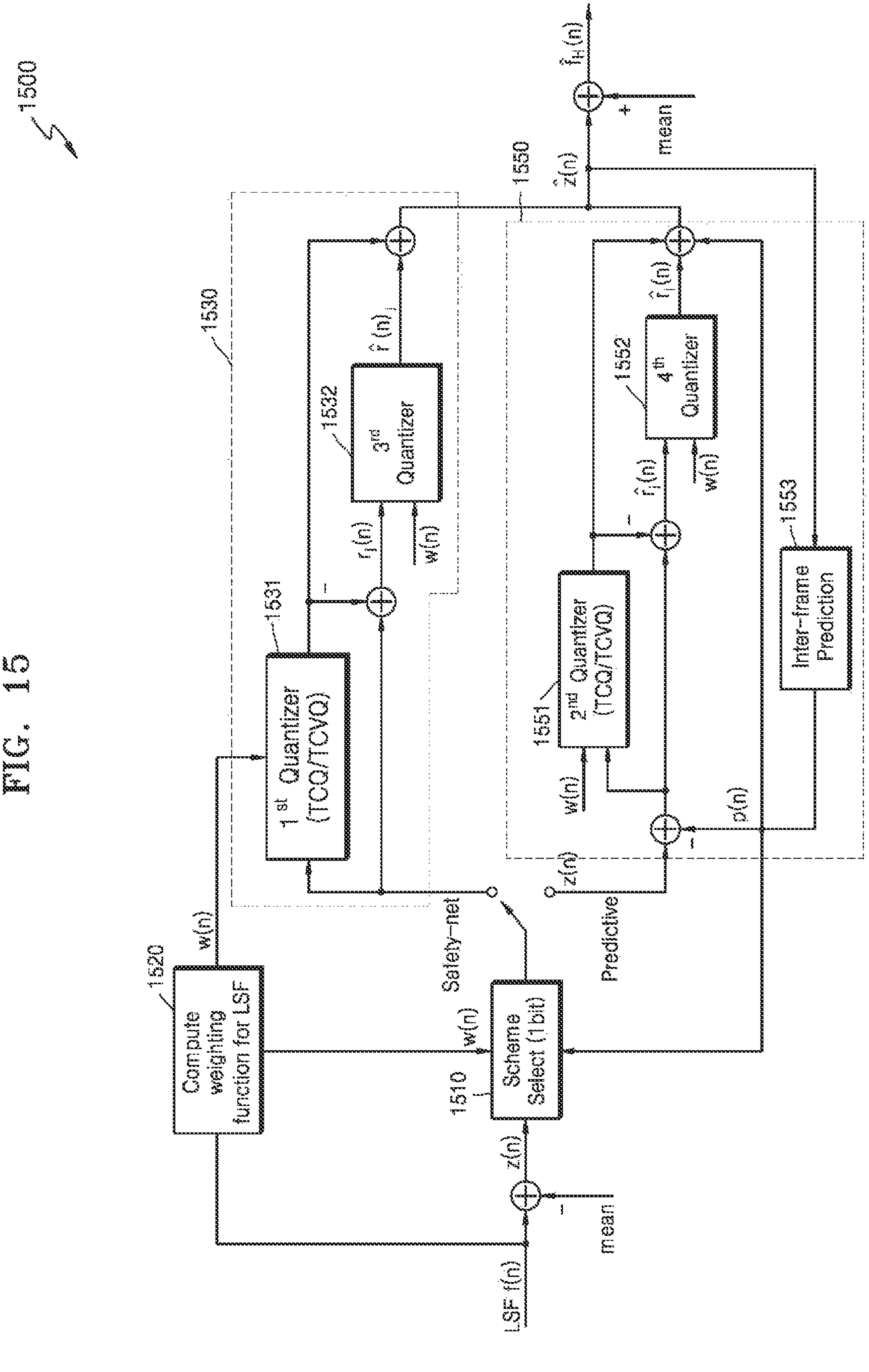
FIG. 15 is a block diagram of a quantization apparatus having a switching structure of an open-loop scheme at a high rate, according to another exemplary embodiment.

FIG. 15 is a block diagram of a quantization apparatus having a switching structure of an open-loop scheme at a high rate, according to another embodiment. A quantization apparatus 1500 shown in FIG. 15 may include a selection unit 1510, a first quantization module 1530, and a second quantization module 1550. When compared with FIG. 14, there are differences in that a third quantizer 1532 is added to the first quantization module 1530, and a fourth quantizer 1552 is added to the second quantization module 1550. In FIGS. 14 and 15, the first quantizers 1431 and 1531 and the second quantizers 1451 and 1551 may use the same codebooks, respectively. Accordingly, although the codebook cannot be said as an optimal codebook, a memory size may be significantly saved. An operation of the quantization device 1500 is described as follows. When the safety-net scheme is selected by the selection unit 1510, the first quantizer 1531 performs first quantization and inverse quantization, and a second error vector indicating a difference between an original signal and an inverse-quantized result may be provided as an input of the third quantizer 1532. The third quantizer 1532 may quantize the second error vector. The third quantizer 1532 may be, for example, an SQ, a VQ, an SVQ, or an MSVQ. After the quantization and inverse quantization, a finally quantized vector may be stored for a subsequent frame.

However, when the predictive scheme is selected by the selection unit 1510, the second quantizer 1551 performs quantization and inverse quantization, and a second error vector indicating a difference between an original signal and an inverse-quantized result may be provided as an input of the fourth quantizer 1552. The fourth quantizer 1552 may quantize the second error vector. The fourth quantizer 1552 may be, for example, an SQ, a VQ, an SVQ, or an MSVQ. After the quantization and inverse quantization, a finally quantized vector may be stored for a subsequent frame.

Figure 16:
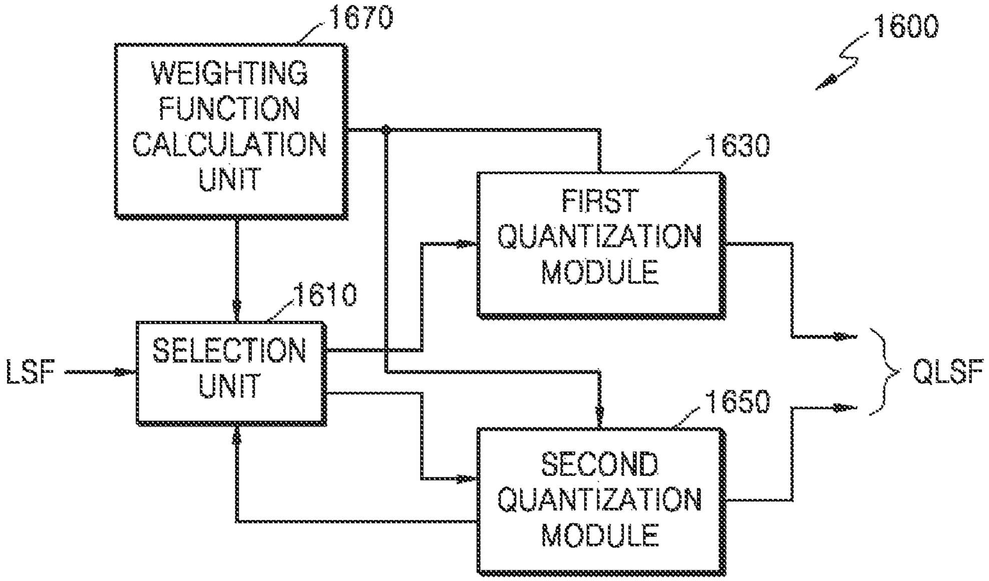
FIG. 16 is a block diagram of an LPC coefficient quantization unit according to an exemplary embodiment.

FIG. 16 is a block diagram of an LPC coefficient quantization unit according to another exemplary embodiment.

An LPC coefficient quantization unit 1600 shown in FIG. 16 may include a selection unit 1610, a first quantization module 1630, a second quantization module 1650, and a weighting function calculation unit 1670. When compared with the LPC coefficient quantization unit 600 shown in FIG. 6, there is a difference in that the weighting function calculation unit 1670 is further included. A detailed implementation example is shown in FIGS. 11A through 11F.

Figure 17:
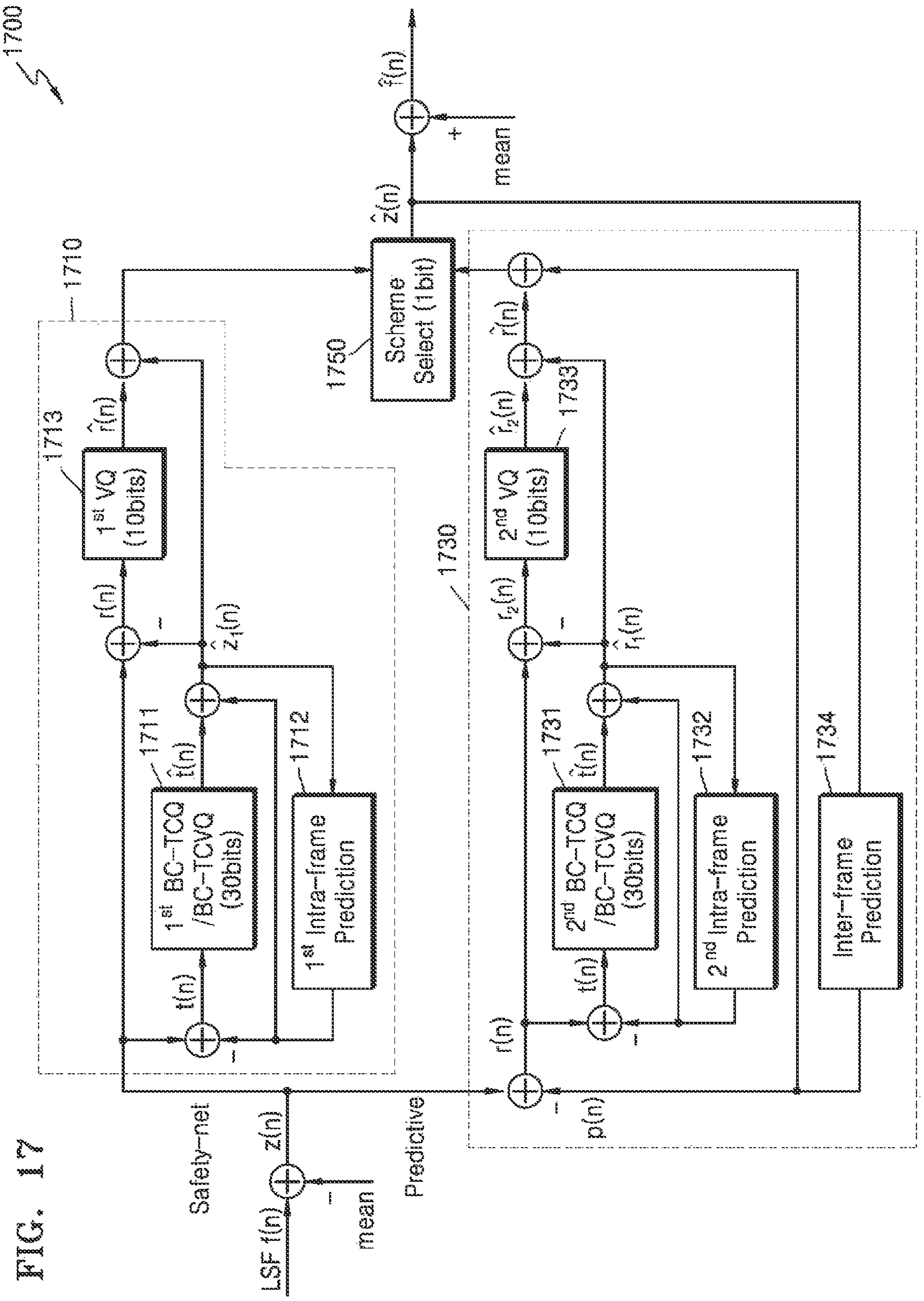
FIG. 17 is a block diagram of a quantization apparatus having a switching structure of a closed-loop scheme, according to an exemplary embodiment.

FIG. 17 is a block diagram of a quantization apparatus having a switching structure of a closed-loop scheme, according to an embodiment. A quantization apparatus 1700 shown in FIG. 17 may include a first quantization module 1710, a second quantization module 1730, and a selection unit 1750. The first quantization module 1710 may include a first quantizer 1711, a first intra-frame predictor 1712, and a third quantizer 1713, and the second quantization module 1730 may include a second quantizer 1731, a second intra-frame predictor 1732, a fourth quantizer 1733, and an inter-frame predictor 1734.

Referring to FIG. 17, in the first quantization module 1710, the first quantizer 1711 may quantize an entire input vector by using a BC-TCVQ or a BC-TCQ through the first intra-frame predictor 1712. The third quantizer 1713 may quantize a quantization error signal by using a VQ.

In the second quantization module 1730, the second quantizer 1731 may quantize a prediction error signal by using a BC-TCVQ or a BC-TCQ through the second intra-frame predictor 1732. The fourth quantizer 1733 may quantize a quantization error signal by using a VQ.

The selection unit 1750 may select one of an output of the first quantization module 1710 and an output of the second quantization module 1730.

In FIG. 17, the safety-net scheme is the same as that of FIG. 9B, and the predictive scheme is the same as that of FIG. 10B. Herein, for inter-frame prediction, one of the AR method and the MA method may be used. According to an embodiment, an example of using a first order AR method is shown. A prediction coefficient is defined in advance, and as a past vector for prediction, a vector selected as an optimal vector between two schemes in a previous frame.

Figure 18:
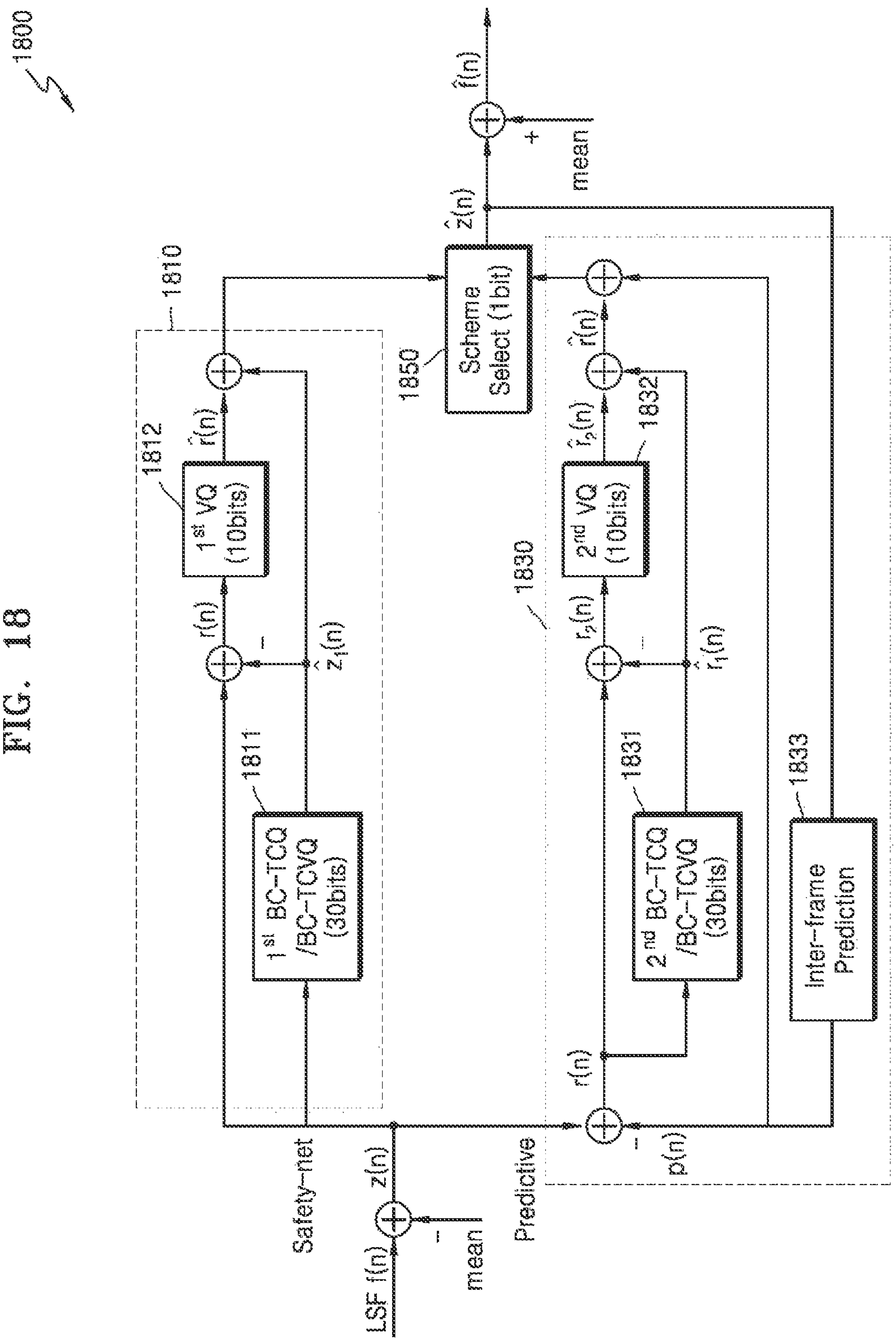
FIG. 18 is a block diagram of a quantization apparatus having a switching structure of a closed-loop scheme, according to another exemplary embodiment.

FIG. 18 is a block diagram of a quantization apparatus having a switching structure of a closed-loop scheme, according to another exemplary embodiment. When compared with FIG. 17, an intra-frame predictor is omitted. A quantization device 1800 shown in FIG. 18 may include a first quantization module 1810, a second quantization module 1830, and a selection unit 1850. The first quantization module 1810 may include a first quantizer 1811 and a third quantizer 1812, and the second quantization module 1830 may include a second quantizer 1831, a fourth quantizer 1832, and an inter-frame predictor 1833.

Referring to FIG. 18, the selection unit 1850 may select or determine an optimal quantization scheme by using, as an input, weighted distortion obtained using an output of the first quantization module 1810 and an output of the second quantization module 1830. An operation of determining an optimal quantization scheme is described as follows.

```
if ( ((predmode!=0) && (WDist[0]<PREFERSFNET*WDist[1]))
                    ||(predmode == 0)
                    ||(WDist[0]<abs_threshold) )
{
safety_net = 1;
}
else{
safety_net = 0;
}
```

Herein, when a prediction mode (predmode) is 0, this indicates a mode in which the safety-net scheme is always used, and when the prediction mode (predmode) is not 0, this indicates that the safety-net scheme and the predictive scheme are switched and used. An example of a mode in which the safety-net scheme is always used may be the TC or UC mode. In addition, WDist[0] denotes weighted distortion of the safety-net scheme, and WDist[1] denotes weighted distortion of the predictive scheme. In addition, abs_threshold denotes a preset threshold. When the prediction mode is not 0, an optimal quantization scheme may be selected by giving a higher priority to the weighted distortion of the safety-net scheme in consideration of a frame error. That is, basically, if a value of WDist[0] is less than the pre-defined threshold, the safety-net scheme may be selected regardless of a value of WDist[1]. Even in the other cases, instead of simply selecting less weighted distortion, for the same weighted distortion, the safety-net scheme may be selected because the safety-net scheme is more robust against a frame error. Therefore, only when WDist[0] is greater than PREFERSFNET*WDist[1], the predictive scheme may be selected. Herein, usable PREFERSFNET=1.15 but is not limited thereto. By doing this, when a quantization scheme is selected, bit information indicating the selected quantization scheme and a quantization index obtained by performing quantization using the selected quantization scheme may be transmitted.

Figure 19:
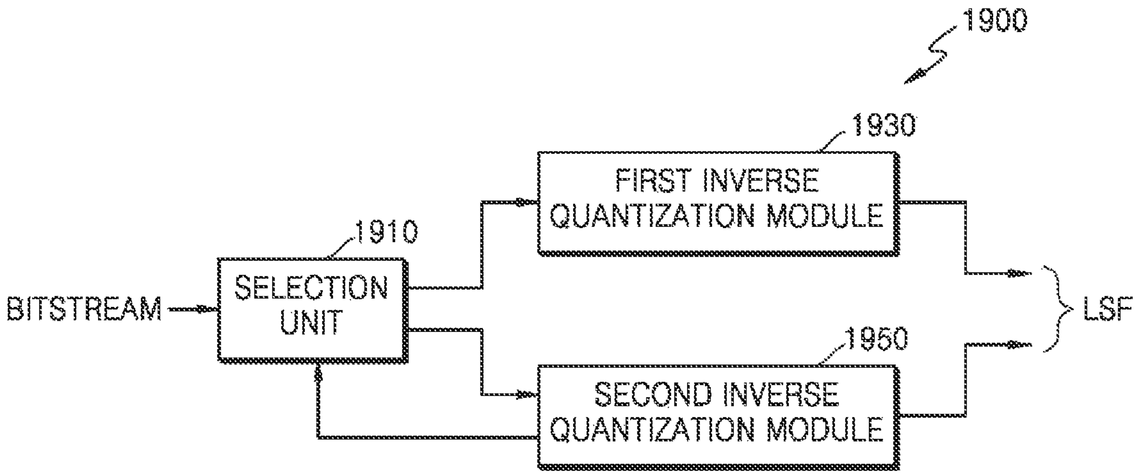
FIG. 19 is a block diagram of an inverse quantization apparatus according to an exemplary embodiment.

FIG. 19 is a block diagram of an inverse quantization apparatus according to an exemplary embodiment.

An inverse quantization apparatus 1900 shown in FIG. 19 may include a selection unit 1910, a first inverse quantization module 1930, and a second inverse quantization module 1950.

Referring to FIG. 19, the selection unit 1910 may provide an encoded LPC parameter, e.g., a prediction residual, to one of the first inverse quantization module 1930 and the second inverse quantization module 1950 based on quantization scheme information included in a bitstream. For example, the quantization scheme information may be represented by one bit.

The first inverse quantization module 1930 may inverse-quantize the encoded LPC parameter without an inter-frame prediction.

The second inverse quantization module 1950 may inverse-quantize the encoded LPC parameter with an inter-frame prediction.

The first inverse quantization module 1930 and the second inverse quantization module 1950 may be implemented based on inverse processing of the first and second quantization modules of each of the various embodiments described above according to an encoding apparatus corresponding to a decoding apparatus.

The inverse quantization apparatus of FIG. 19 may be applied regardless of whether a quantizer structure is an open-loop scheme or a closed-loop scheme.

The VC mode in a 16-KHz internal sampling frequency may have two decoding rates of, for example, 31 bits per frame or 40 or 41 bits per frame. The VC mode may be decoded by a 16-state 8-stage BC TCVQ.

Figure 20:
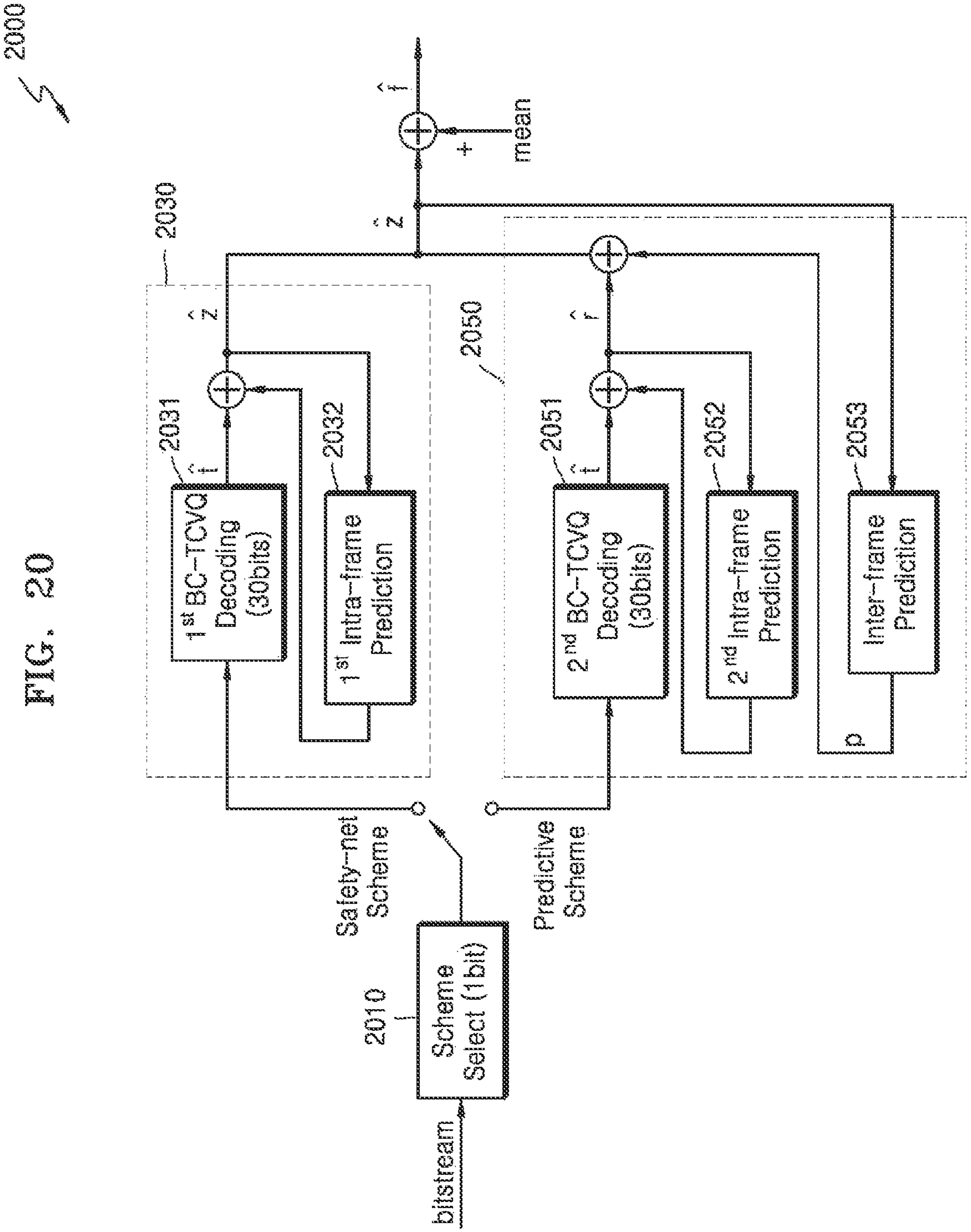
FIG. 20 is a detailed block diagram of the inverse quantization apparatus according to an exemplary embodiment.

FIG. 20 is a block diagram of the inverse quantization apparatus according to an exemplary embodiment which may correspond to an encoding rate of 31 bits. An inverse quantization apparatus 2000 shown in FIG. 20 may include a selection unit 2010, a first inverse quantization module 2030, and a second inverse quantization module 2050. The first inverse quantization module 2030 may include a first inverse quantizer 2031 and a first intra-frame predictor 2032, and the second inverse quantization module 2050 may include a second inverse quantizer 2051, a second intra-frame predictor 2052, and an inter-frame predictor 2053. The inverse quantization apparatus of FIG. 20 may correspond to the quantization apparatus of FIG. 12.

Referring to FIG. 20, the selection unit 2010 may provide an encoded LPC parameter to one of the first inverse quantization module 2030 and the second inverse quantization module 2050 based on quantization scheme information included in a bitstream.

When the quantization scheme information indicates the safety-net scheme, the first inverse quantizer 2031 of the first inverse quantization module 2030 may perform inverse quantization by using a TCQ, a TCVQ, a BC-TCQ or a BC-TCVQ. A quantized LSF coefficient may be obtained through the first inverse quantizer 2031 and the first intra-frame predictor 2032. A finally decoded LSF coefficient is generated by adding a mean value that is a predetermined DC value to the quantized LSF coefficient.

However, when the quantization scheme information indicates the predictive scheme, the second inverse quantizer 2051 of the second inverse quantization module 2050 may perform inverse quantization by using a TCQ, a TCVQ, a BC-TCQ or a BC-TCVQ. An inverse quantization operation starts from the lowest vector among LSF vectors, and the intra-frame predictor 2052 generates a prediction value for a vector element of a next order by using a decoded vector. The inter-frame predictor 2053 generates a prediction value through a prediction between frames by using an LSF coefficient decoded in a previous frame. A finally decoded LSF coefficient is generated by adding an inter-frame prediction value obtained by the inter-frame predictor 2053 to a quantized LSF coefficient obtained through the second inverse quantizer 2051 and the intra-frame predictor 2052 and then adding a mean value that is a predetermined DC value to the addition result.

The decoding process in FIG. 20 will be described as follows.

When the safety-net scheme is used, the decoding of $\hat{z}_k(i)$ may be performed by Equation 19 below.

$$\hat{z}_k(i-1)=\hat{t}_k(i-1)+A_{i-1}\hat{z}_k(i-2),\ \text{for } i=2,\ \ldots\ ,M/2 \qquad \text{[Equation 19]}$$

Herein, a prediction residual, $t_k(i)$ may be decoded by a first inverse quantizer 2031.

When the predictive scheme is used, a prediction vector $p_k(i)$ may be obtained by Equation 20 below.

$$p_k(i)=\rho(i)\hat{z}_{k-1}'(i),\ \text{for } i=0,\ \ldots\ ,M-1 \qquad \text{[Equation 20]}$$

Herein, $\rho(i)$ denotes an AR prediction coefficient selected for a specific coding mode at a specific internal sampling frequency, for example, a VC mode at 16 kHz, and M denotes a dimension of LPC. $\hat{z}'_{k-1}(i)[\hat{z}^t_{k-1}(0),\ \hat{z}^t_{k-1}(1),\ \ldots,\ \hat{z}^t_{k-1}(M/2-1)]$ may also be concluded.

The decoding of $\hat{r}_k(i)$ may be performed by Equation 21 below.

$$\hat{r}_k(i-1)=\hat{t}_k(i-1)+A_{i-1}\hat{r}_k(i-2),\ \text{for } i=2,\ \ldots\ ,M/2 \qquad \text{[Equation 21]}$$

Herein, a prediction residual, $t_k(i)$ may be decoded by a second inverse quantizer 2051.

A quantized LSF vector $\hat{f}_k(i)$ for a predictive scheme may be obtained by Equation 22 below.

$$\hat{f}_k(i)=p_k(i)+m(i)+\hat{r}'_k(i),\ \text{for } i=0,\ \ldots\ ,M-1 \qquad \text{[Equation 22]}$$

Herein, m(i) denotes an average vector in a specific coding mode, for example, a VC mode. $\hat{r}'_k(i)[\hat{r}^t_k(0),\ \hat{r}^t_k(1),\ \ldots,\ \hat{r}^t_k(M/2-1)]$ may also be concluded.

A quantized LSF vector $\hat{f}_k(i)$ for a safety-net scheme may be obtained by Equation 23 below.

$$\hat{f}_k(i)=m(i)+\hat{z}'_k(i)\ \text{for } i=0,\ \ldots\ ,M-1 \qquad \text{[Equation 23]}$$

Herein, m(i) denotes an average vector in a specific coding mode, for example, a VC mode. $\hat{z}'_k(i)[\hat{z}^t_k(0),\ \hat{z}^t_k(1),\ \ldots,\ \hat{z}^t_k(M/2-1)]$ may also be concluded.

Figure 21:
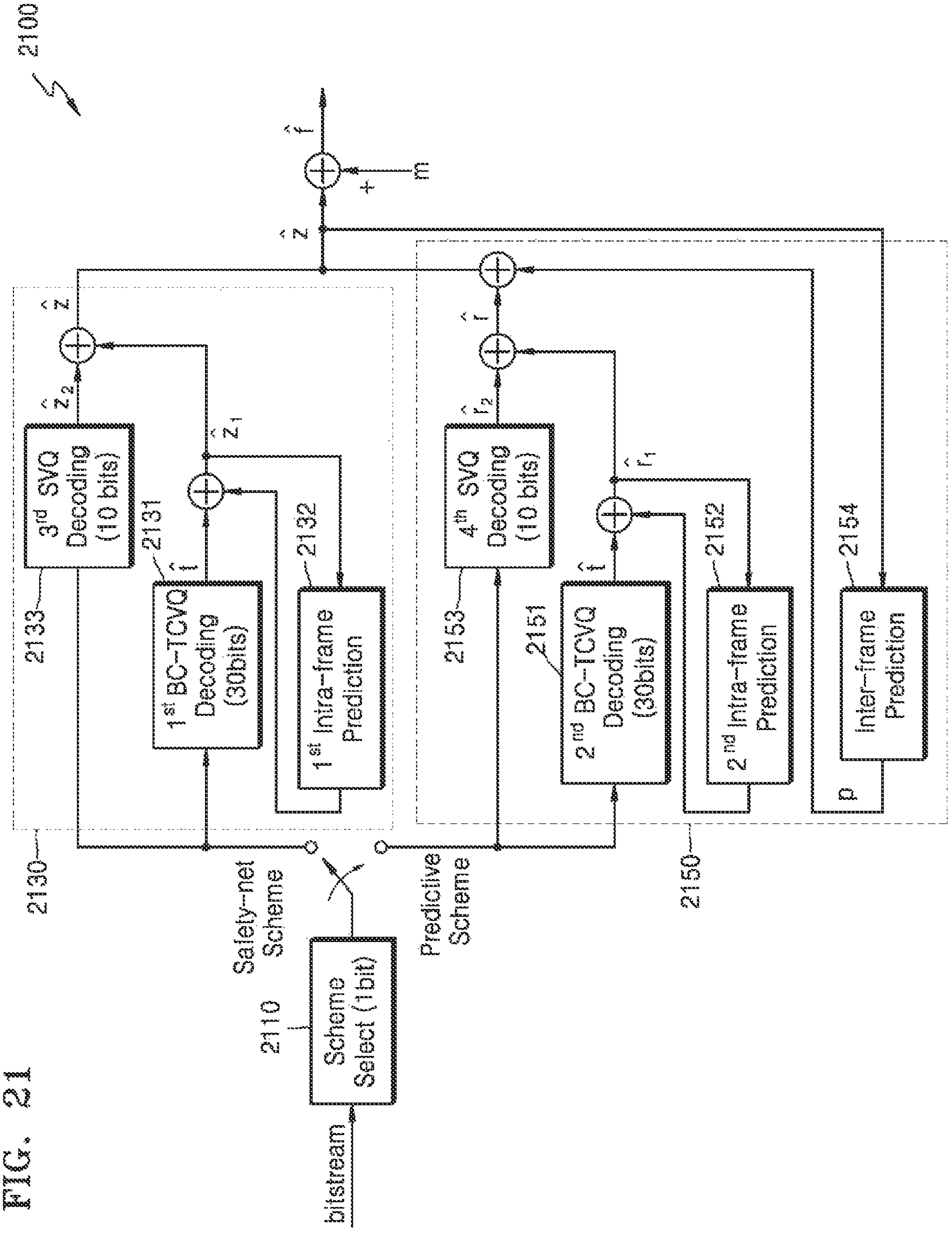
FIG. 21 is a detailed block diagram of the inverse quantization apparatus according to another exemplary embodiment.

FIG. 21 is a detailed block diagram of the inverse quantization apparatus according to another embodiment which may correspond to an encoding rate of 41 bits. An inverse quantization apparatus 2100 shown in FIG. 21 may include a selection unit 2110, a first inverse quantization module 2130, and a second inverse quantization module 2150. The first inverse quantization module 2130 may include a first inverse quantizer 2131, a first intra-frame predictor 2132, and a third inverse quantizer 2133, and the second inverse quantization module 2150 may include a second inverse quantizer 2151, a second intra-frame predictor 2152, a fourth inverse quantizer 2153, and an inter-frame predictor 2154. The inverse quantization apparatus of FIG. 21 may correspond to the quantization apparatus of FIG. 13.

Referring to FIG. 21, the selection unit 2110 may provide an encoded LPC parameter to one of the first inverse quantization module 2130 and the second inverse quantization module 2150 based on quantization scheme information included in a bitstream.

When the quantization scheme information indicates the safety-net scheme, the first inverse quantizer 2131 of the first inverse quantization module 2130 may perform inverse quantization by using a BC-TCVQ. The third inverse quantizer 2133 may perform inverse quantization by using an SVQ. A quantized LSF coefficient may be obtained through the first inverse quantizer 2131 and the first intra-frame predictor 2132. A finally decoded LSF coefficient is generated by adding a quantized LSF coefficient obtained by the third inverse quantizer 2133 to the quantized LSF coefficient and then adding a mean value that is a predetermined DC value to the addition result.

However, when the quantization scheme information indicates the predictive scheme, the second inverse quantizer 2151 of the second inverse quantization module 2150 may perform inverse quantization by using a BC-TCVQ. An inverse quantization operation starts from the lowest vector among LSF vectors, and the second intra-frame predictor 2152 generates a prediction value for a vector element of a next order by using a decoded vector. The fourth inverse quantizer 2153 may perform inverse quantization by using an SVQ. A quantized LSF coefficient provided from the fourth inverse quantizer 2153 may be added to a quantized LSF coefficient obtained through the second inverse quantizer 2151 and the second intra-frame predictor 2152. The inter-frame predictor 2154 may generate a prediction value through a prediction between frames by using an LSF coefficient decoded in a previous frame. A finally decoded LSF coefficient is generated by adding an inter-frame prediction value obtained by the inter-frame predictor 2153 to the addition result and then adding a mean value that is a predetermined DC value thereto.

Herein, the third inverse quantizer 2133 and the fourth inverse quantizer 2153 may share a codebook.

The decoding process in FIG. 21 will be described as follows.

The scheme selection and decoding processes of the first and second inverse quantizer 2131 and 2151 are identical with those of FIG. 20. The decoding of $\hat{z}_2(i)$ and $\hat{r}_2(i)$ may also be performed by the third and fourth inverse quantizer 2133 and 2153.

A quantized LSF vector $\hat{f}_k(i)$ for a predictive scheme may be obtained by Equation 24 below.

$$\hat{f}_k(i)=p_k(i)+m(i)+\hat{r}_1(i)+\hat{r}_2(i),\ \text{for } i=0,\ \ldots\ ,M-1 \qquad \text{[Equation 24]}$$

Herein, $\hat{r}_1(i)$ may be obtained from the second inverse quantizer 2151 and the second intra-frame predictor 2152.

A quantized LSF vector $\hat{f}_k(i)$ for a safety-net scheme may be obtained by Equation 25 below.

$$\hat{f}_k(i)=m(i)+\hat{z}_1(i)+\hat{z}_2(i),\ \text{for } i=0, \ldots ,M-1 \quad \text{[Equation 25]}$$

Herein, $\hat{z}_1(i)$ may be obtained from the first inverse quantizer 2131 and the first intra-frame predictor 2132.

Although not shown, the inverse quantization apparatuses of FIGS. 19 through 21 may be used as components of a decoding apparatus corresponding to FIG. 2.

In each Equations, k may denote a frame and i or j may denote a stage.

The contents related to a BC-TCVQ employed in association with LPC coefficient quantization/inverse quantization are described in detail in "Block Constrained Trellis Coded Vector Quantization of LSF Parameters for Wideband Speech Codecs" (Jungeun Park and Sangwon Kang, ETRI Journal, Volume 30, Number 5, October 2008). In addition, the contents related to a TCVQ are described in detail in "Trellis Coded Vector Quantization" (Thomas R. Fischer et al, IEEE Transactions on Information Theory, Vol. 37, No. 6, November 1991).

The methods according to the embodiments may be edited by computer-executable programs and implemented in a general-use digital computer for executing the programs by using a computer-readable recording medium. In addition, data structures, program commands, or data files usable in the embodiments of the present invention may be recorded in the computer-readable recording medium through various means. The computer-readable recording medium may include all types of storage devices for storing data readable by a computer system. Examples of the computer-readable recording medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. In addition, the computer-readable recording medium may be a transmission medium for transmitting a signal for designating program commands, data structures, or the like. Examples of the program commands include a high-level language code that may be executed by a computer using an interpreter as well as a machine language code made by a compiler.

Although the embodiments of the present invention have been described with reference to the limited embodiments and drawings, the embodiments of the present invention are not limited to the embodiments described above, and their updates and modifications could be variously carried out by those of ordinary skill in the art from the disclosure. Therefore, the scope of the present invention is defined not by the above description but by the claims, and all their uniform or equivalent modifications would belong to the scope of the technical idea of the present invention.

What is claimed is:

1. A quantization apparatus comprising:

an inter-frame predictor configured to generate a first prediction vector of a current frame from a quantized input vector of a previous frame;

an intra-frame predictor configured to generate a second prediction vector of a current stage from a prediction matrix and a quantized first error vector of a previous stage, wherein the quantized first error vector of the previous stage is obtained based on a second prediction vector of the previous stage and a quantized second error vector of the previous stage; and a trellis-structured vector quantizer configured to quantize a second error vector of the current stage which corresponds to a difference between a first error vector of the current frame and the second prediction vector of the current stage to generate a quantized second error vector of the current stage, wherein the first error vector of the current frame corresponds to a difference between the first prediction vector of the current frame and an input vector of the current frame.

2. The apparatus of claim 1, wherein the intra-frame predictor is configured to estimate an N-dimension sub-vector of the second prediction vector by using an N×N prediction matrix and an N-dimension sub-vector of the quantized first error vector, N being a natural number greater than or equal to 2.

3. The apparatus of claim 1, wherein a trellis-structured vector quantizer is configured to partition the second error vector into N-dimension sub-vectors, and allocate the N-dimension sub-vectors to a plurality of stages.

4. The apparatus of claim 1, wherein the prediction matrix is predefined by the codebook training.

5. The apparatus of claim 1, further comprising a vector quantizer configured to quantize a third error vector which corresponds to a difference between the first error vector of the current frame and a quantized first error vector of the current frame.

6. The apparatus of claim 1, wherein the trellis-structured vector quantizer is configured to search for an optimal index based on a weighting function.

7. The apparatus of claim 5, wherein the vector quantizer is configured to search for an optimal index based on a weighting function.

8. A quantization apparatus comprising:

a first quantization module for performing quantization without an inter-frame prediction; and a second quantization module for performing quantization with an inter-frame prediction, wherein the first quantization module comprises:

a first intra-frame predictor configured to generate a prediction vector by estimating a current stage sub-vector of the prediction vector based on a first prediction matrix of a current stage and a previous stage sub-vector of a quantized input vector, wherein the quantized input vector is obtained based on a quantized prediction error vector and the prediction vector; and a first trellis-structured vector quantizer configured to quantize a prediction error vector which corresponds to a difference between the prediction vector and an input vector to generate the quantized prediction error vector.

9. The apparatus of claim 8, wherein the second quantization module comprises:

an inter-frame predictor configured to generate a first prediction vector of a current frame from a quantized input vector of a previous frame;

a second intra-frame predictor configured to generate a second prediction vector of the current frame by estimating a current stage sub-vector of the second prediction vector of the current frame based on a second prediction matrix of a current stage and a previous stage sub-vector of a quantized first error vector of the current frame, wherein the quantized first error vector of the current frame is obtained based on the second prediction vector of the current frame and a quantized second error vector of the current frame; and a second trellis-structured vector quantizer configured to quantize a second error vector of the current frame which corresponds to a difference between a first error vector of the current frame and the second prediction vector of the current frame to generate the quantized second prediction error vector of a current frame, wherein the first error vector of the current frame corresponds to a difference between the first prediction vector of the current frame and an input vector of a current frame.

10. The apparatus of claim 8, further comprising a selector configured to select one of the first quantization module and the second quantization module in an open loop manner.

11. The apparatus of claim 9, wherein:

the first quantization module further comprises a first vector quantizer configured to quantize a quantization error vector which corresponds to a difference between the input vector and the quantized input vector, and the second quantization module further comprises a second vector quantizer configured to quantize a third error vector which corresponds to a difference between the first error vector and the quantized first error vector.

12. The apparatus of claim 11, wherein the first and second vector quantizer are configured to share a codebook.

* * * * *